United States Patent
Zhou

(10) Patent No.: US 12,530,131 B2
(45) Date of Patent: Jan. 20, 2026

(54) MEMORY DEVICE, MEMORY SYSTEM, AND METHOD OF OPERATING THE SAME

(71) Applicant: YANGTZE MEMORY TECHNOLOGIES CO., LTD., Wuhan (CN)

(72) Inventor: Teng Zhou, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/615,660

(22) Filed: Mar. 25, 2024

(65) Prior Publication Data

US 2025/0271998 A1    Aug. 28, 2025

Related U.S. Application Data

(63) Continuation of application No. PCT/CN2024/078077, filed on Feb. 22, 2024.

(51) Int. Cl.
*G06F 3/06* (2006.01)
*G11C 29/44* (2006.01)

(52) U.S. Cl.
CPC .......... *G06F 3/0619* (2013.01); *G06F 3/0659* (2013.01); *G06F 3/0679* (2013.01); *G11C 29/44* (2013.01)

(58) Field of Classification Search
CPC .... G06F 3/0619; G06F 3/0659; G06F 3/0679; G11C 29/44
See application file for complete search history.

(56) References Cited

U.S. PATENT DOCUMENTS

| | | | |
|---|---|---|---|
| 9,007,854 B1* | 4/2015 | Nemati Anaraki | G06F 11/10 365/230.06 |
| 2011/0007563 A1 | 1/2011 | Yoo et al. | |
| 2013/0201763 A1 | 8/2013 | Yang | |
| 2018/0158493 A1 | 6/2018 | Ryu | |
| 2019/0172542 A1 | 6/2019 | Miladinovic | |
| 2020/0210259 A1* | 7/2020 | Hoei | G11C 16/3418 |
| 2020/0350023 A1 | 11/2020 | Hong | |

(Continued)

FOREIGN PATENT DOCUMENTS

| | | |
|---|---|---|
| CN | 115497540 A | 12/2022 |
| TW | 202334970 A | 9/2023 |

OTHER PUBLICATIONS

International Search Report issued in corresponding International Application No. PCT/CN2024/078077, mailed on Aug. 27, 2024, 4 pages.

*Primary Examiner* — Hiep T Nguyen
(74) *Attorney, Agent, or Firm* — BAYES PLLC

(57) ABSTRACT

A method of operating a memory system includes performing a first read operation with a first read voltage of a first single read level, performing a first shift-read operation with the first read voltage plus a first offset voltage, performing a second shift-read operation with the first read voltage minus the first offset voltage, and in response to that a difference between first bit flip information of the first shift-read operation and second bit flip information of the second shift-read operation is equal to or lower than a threshold, determining that the first read voltage is a first optimal read voltage. The first single read level of a first page is under a multi-level architecture.

20 Claims, 20 Drawing Sheets

(56) References Cited

U.S. PATENT DOCUMENTS

| | | |
|---|---|---|
| 2021/0191638 A1* | 6/2021 | Miladinovic ........ G11C 29/021 |
| 2022/0051745 A1 | 2/2022 | You |
| 2022/0100413 A1 | 3/2022 | Kim |
| 2023/0066469 A1* | 3/2023 | Goode .................. G06F 3/0679 |
| 2023/0068702 A1* | 3/2023 | Muchherla ............. G11C 16/10 |
| 2024/0185943 A1* | 6/2024 | Kale .................... G11C 29/021 |

* cited by examiner

| | L0 | L1 | L2 | L3 | L4 | L5 | L7 | L7 |
|---|---|---|---|---|---|---|---|---|
| LP (D1) | 1 | 0 | 0 | 0 | 0 | 1 | 1 | 1 |
| MP (D2) | 1 | 1 | 0 | 0 | 1 | 1 | 0 | 0 |
| UP (DC) | 1 | 1 | 1 | 0 | 0 | 0 | 0 | 1 |

FIG. 5A

| LP | Vrd_p1 | | | | Vrd_p5 | | | |
|---|---|---|---|---|---|---|---|---|
| Vread | number of 1 | number of 0 | bit flip count of 0->1 | bit flip count of 1->0 | number of 1 | number of 0 | bit flip count of 0->1 | bit flip count of 1->0 |
| V00 | | | | | | N00 | | |
| V0 | N01 | | | | | N10 | | N10-N00 |
| V1=V0-shift value | N11 | | | N01-N11 | | N20 | N00-N20 | |
| V2=V0+shift value | N21 | | N21-N01 | | | | | |

FIG. 5B

| Vread | number of 0 | number of 1 | bit flip count of 0->1 | bit flip count of 1->0 |
|---|---|---|---|---|
| Vread 0 | N00 | N01 | | |
| Vread1=Vread0-shift value | N10 | N11 | | N01-N11 or N10-N00 |
| Vread2=Vread0+shift value | N20 | N21 | N21-N01 or N00-N20 | |

FIG. 6C

MEMORY DEVICE, MEMORY SYSTEM, AND METHOD OF OPERATING THE SAME

CROSS-REFERENCE TO RELATED APPLICATIONS

This application is a continuation of International Application No. PCT/CN2024/078077, filed on Feb. 22, 2024, entitled "MEMORY DEVICE, MEMORY SYSTEM, AND METHOD OF OPERATING THE SAME," which is incorporated herein by reference in its entirety.

BACKGROUND

The present disclosure relates to a memory device, a memory system, and a method of operating the same.

In a non-volatile memory device, as multi-bit per memory cell storage architecture emerges and becomes more popular in the industry, read margins become narrower, and thus, memory devices are more vulnerable to noises, program/read disturbances, coupling issues, charge loss, etc. Accordingly, more read errors occur during the read operation. Therefore, several solutions are introduced to minimize the raw bit-error rate (RBER) of memory cells.

SUMMARY

In one aspect, a method of operating a memory system includes performing a first read operation with a first read voltage of a first single read level, performing a first shift-read operation with the first read voltage plus a first offset voltage, performing a second shift-read operation with the first read voltage minus the first offset voltage, and in response to that a difference between first bit flip information of the first shift-read operation and second bit flip information of the second shift-read operation is equal to or lower than a threshold, determining that the first read voltage is a first optimal read voltage. The first single read level of a first page is under a multi-level architecture.

In some implementations, the method further includes, in response to that the difference between the first bit flip information of the first shift-read operation and the second bit flip information of the second shift-read operation is higher than the threshold, determining that the first read voltage is not the first optimal read voltage.

In some implementations, after determining that the first read voltage is not the first optimal read voltage, the method further includes performing a second read operation with a second read voltage. The second read voltage is determined based on the difference between the first bit flip information of the first shift-read operation and the second bit flip information of the second shift-read operation.

In some implementations, the second read voltage is determined based on the difference between the first bit flip information of the first shift-read operation and the second bit flip information of the second shift-read operation further includes, in response to that the first bit flip information of the first shift-read operation is higher than the second bit flip information of the second shift-read operation, the second read voltage is determined to be higher than the first read voltage, and in response to that the first bit flip information of the first shift-read operation is lower than the second bit flip information of the second shift-read operation, the second read voltage is determined to be lower than the first read voltage.

In some implementations, in response to that the first bit flip information of the first shift-read operation is higher than the second bit flip information of the second shift-read operation, the second read voltage is determined to be the first read voltage minus half of the first offset voltage, and in response to that the first bit flip information of the first shift-read operation is lower than the second bit flip information of the second shift-read operation, the second read voltage is determined to be the first read voltage plus half of the first offset voltage.

In some implementations, the first bit flip information of the first shift-read operation is determined by a first bit flip count between the first shift-read operation and the first read operation, and the second bit flip information of the second shift-read operation is determined by a second bit flip count between the second shift-read operation and the first read operation.

In some implementations, before performing a first read operation with a first read voltage, the method further includes determining the first single read level.

In some implementations, in response to determining that the first read voltage is the first optimal read voltage, the method further includes determining a second single read level.

In some implementations, determining whether the first read voltage is the first optimal read voltage is further based on a threshold voltage normal distribution characteristic.

In some implementations, in response to determining all optimal read voltages, the method further includes performing a normal-read operation based on all the optimal read voltages.

In some implementations, the method further includes performing a first pre-read operation with a first pre-read voltage and a second pre-read operation with a second pre-read voltage to determine a first pre-read bit flip information, based on the first pre-read bit flip information and a first relationship between bit flip information and read offset in the first single read level, determining a first read offset, and determining a first optimal read voltage based on the first pre-read voltage and the first read offset.

In some implementations, the method further includes determining a second read voltage based on a second single read level using the first relationship of the first single read level.

In some implementations, the method further includes performing a first pre-read operation with a first pre-read voltage, and a second pre-read operation with a second pre-read voltage to determine a first pre-read bit flip information, based on the first pre-read bit flip information in the first single read level, determining a first read offset, determining other read offsets based on the first read offset, and determining the first read voltage based on the first pre-read voltage and the first read offset.

In some implementations, the first pre-read voltage and the second pre-read voltage in the first single read level of the first page are under the multi-level architecture.

In some implementations, the method further includes performing a first pre-read operation with a first pre-read voltage, and a second pre-read operation with a second pre-read voltage to determine first pre-read bit flip information, performing the first pre-read operation with the first pre-read voltage, and a third pre-read operation with a third pre-read voltage to determine second pre-read bit flip information, based on a difference between the first pre-read bit flip information and the second pre-read bit flip information, and a first relationship between difference in bit flip information and read offset in the first single read level, determining a first read offset, and determining the first read voltage based on the first pre-read voltage and the first read offset.

In another aspect, a method for reading a memory cell array includes determining all optimal read voltages. Determining all optimal read voltages includes performing a first read operation with a first read voltage, performing a first shift-read operation with the first read voltage plus a first offset voltage, performing a second shift-read operation with the first read voltage minus the first offset voltage, and based on a comparison between a first bit flip information of the first shift-read operation and a second bit flip information of the second shift-read operation, determining whether the first read voltage is a first optimal read voltage, and performing a normal-read operation based on all the optimal read voltages to readout data.

In some implementations, the determining all optimal read voltages further includes correcting any errors in data using an error correction codes (ECC) algorithm.

In some implementations, the method further includes performing a read retry operation.

In some implementations, the method further includes performing a firmware initial read operation.

In some implementations, before correcting any errors in data using an error correction codes (ECC) algorithm, the method further includes decoding the data read from the memory cell array.

In still another aspect, a memory device includes a memory cell array. The memory cell array includes memory cells, and a peripheral circuit coupled to the memory cell array. The peripheral circuit is configured to: apply a first read voltage to target memory cells in a first read operation, apply the first read voltage plus a first offset voltage to the target memory cells in a first shift-read operation, apply the first read voltage minus the first offset voltage to the target memory cells a second shift-read operation, in response to that a first bit flip information of the first shift-read operation is higher than a second bit flip information of the second shift-read operation, apply the first read voltage minus half of the first offset voltage, and in response to that the first bit flip information is lower than the second bit flip information, apply the first read voltage plus half of the first offset voltages.

In some implementations, the peripheral circuit is further configured to: store the first bit flip information of the first shift-read operation and the second bit flip information of the second shift-read operation in a page buffer of the peripheral circuit or the memory cell array.

In yet still another aspect, a memory system includes a memory device, and a memory controller coupled to the memory device. The memory device includes a memory cell array comprising memory cells, and a peripheral circuit coupled to the memory cell array. The memory controller is configured to: instruct the peripheral circuit to perform a first read operation with a first read voltage of a first single read level, instruct the peripheral circuit to perform a first shift-read operation with the first read voltage plus a first offset voltage, instruct the peripheral circuit to perform a second shift-read operation with the first read voltage minus the first offset voltage, and in response to that a difference between first bit flip information of the first shift-read operation and second bit flip information of the second shift-read operation is equal to or lower than a threshold, determine that the first read voltage is a first optimal read voltage. The first single read level of a first page is under a multi-level architecture.

In some implementations, the memory controller is further configured to: calculate the first bit flip information of the first shift-read operation and the second bit flip information of the second shift-read operation.

In some implementations, the memory controller is further configured to: store the first bit flip information of the first shift-read operation and the second bit flip information of the second shift-read operation in a cache memory of the memory controller.

In some implementations, the memory controller is further configured to: perform a read retry operation.

In some implementations, the memory controller is further configured to: perform a normal-read operation based on all the optimal read voltages to readout data, and correct errors in the data by using an error correction codes (ECC) algorithm when the read retry operation is failed.

In some implementations, the memory controller is further configured to perform a firmware initial read operation.

In some implementations, the memory controller is further configured to: decode the data read from the memory cell array.

In yet still another aspect, a non-transitory computer-readable medium storing instructions that, when executed by a processor, cause the processor to perform a method including performing a first read operation with a first read voltage in a first single read level, performing a first shift-read operation with the first read voltage plus a first offset voltage, performing a second shift-read operation with the first read voltage minus the first offset voltage, and in response to that a difference between first bit flip information of the first shift-read operation and second bit flip information of the second shift-read operation is equal to or lower than a threshold, determining that the first read voltage is a first optimal read voltage. The first single read level of a first page is under a multi-level architecture.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 5A illustrates a table showing an example method for determining an optimal read voltage, according to some implementations of the present disclosure.

FIG. 5B illustrates a table showing an example method for determining an optimal read voltage, according to some implementations of the present disclosure.

FIG. 6C illustrates a table showing an example method for determining an optimal read voltage, according to some implementations of the present disclosure.

Figure 1:
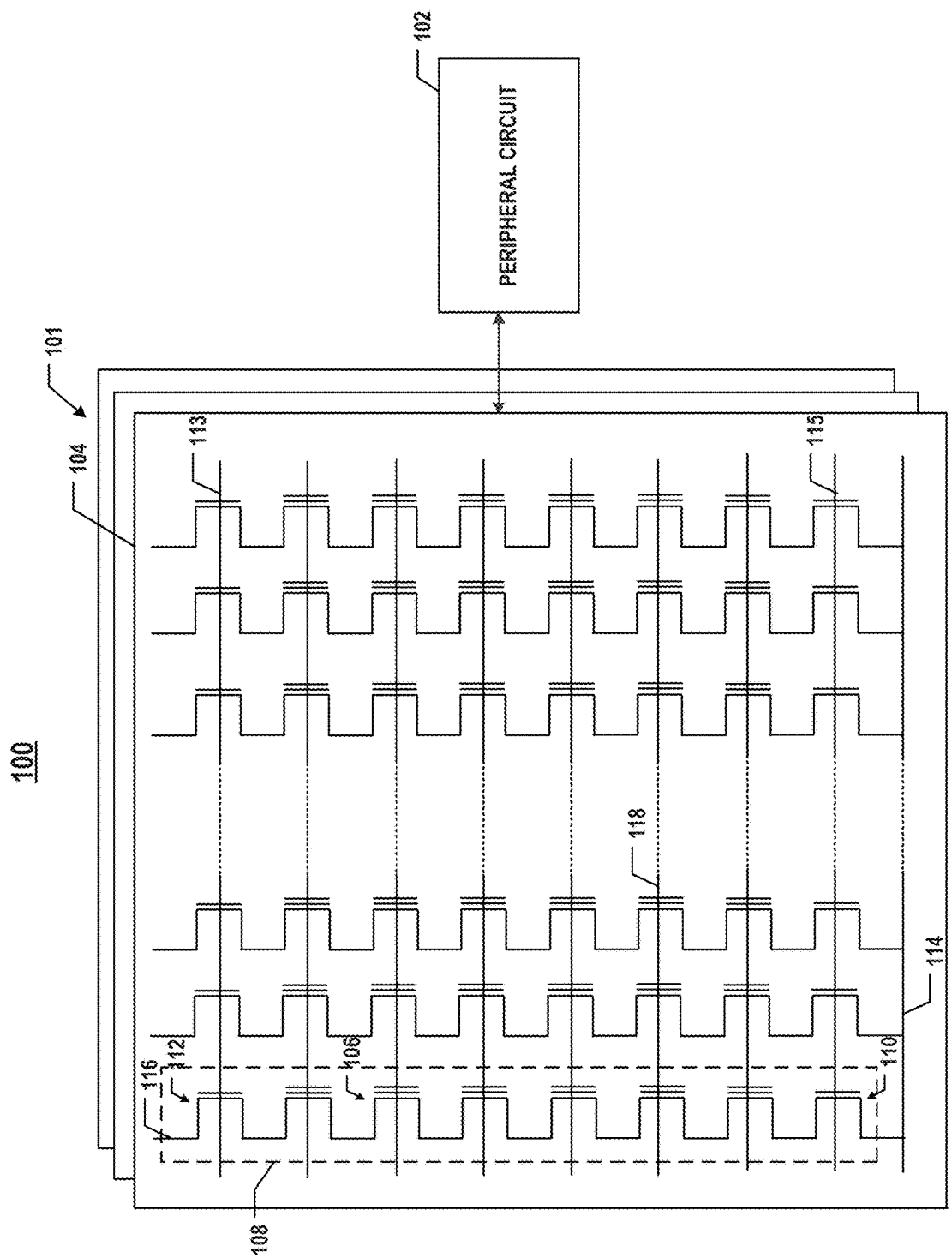
FIG. 1 illustrates a schematic circuit diagram of an example memory device including peripheral circuits, according to some implementations of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In a non-volatile memory device, multi-bit per memory cell storage architecture emerges and becomes popular in the industry. Read margins become narrower, and thus, the memory devices are more vulnerable to various types of noises, program/read disturbances, coupling issues, charge loss, etc. For example, multi-level cell (MLC) technology significantly reduces read margins between different threshold voltage (Vth) levels used to store multiple bits in a single memory cell. However, Vth levels of the memory cells may shift beyond the read reference voltages (Vref), i.e., the voltage used to distinguish between cell Vth levels, which leads to more read errors.

One of the approaches is to apply a read retry operation. Read retry operation can be used to determine the optimal read voltages of the memory device. However, a large number of read retry operations may lead to significant performance degradation due to the read latency by introducing multiple read retry steps that read the target page again with adjusted read reference voltages (Vref). Another approach is to apply error-correcting codes (ECC) that may detect and correct raw bit errors. However, ECC can merely detect and correct limited errors. Accordingly, more solutions should be applied in combination with these approaches, thereby reducing the read error rate while maintaining the performance of the memory system.

To address one or more of the aforementioned issues, the present disclosure introduces solutions in which several methods are used to determine optimal read voltages for each read level. In particular, the present disclosure introduces solutions in which a single level read can be used to determine the optimal read voltages such that the time for calculation is reduced and the overall performance is improved. In addition, the present disclosure also provides solutions in which multiple methods for data recovery to correct data and reduce RBER are implemented. It is noted that a single level read is a read operation that reads out at least a bit of data stored in a memory cell as one order bit "0" or "1" using a single reference voltage level (e.g., a single read reference voltage level). The data stored in the memory cell may include multiple bits (e.g., 110, 001, or 011). The single reference voltage level may be, for example, a first single read level (RV1) to distinguish adjacent program states (e.g., L0 and L1) from each other. For example, the first single read level (RV1) voltage ($V_{RV1}$) may be applied to a word line connected to a target memory cell and a pass voltage is applied to the other word lines. Next, the data stored in the target memory cell can be determined as "0" or "1" depending on whether current is detected under the first single read level voltage $V_{RV1}$ in a bit line connected to the target memory cell. It is noted that, in some implementations, the bit count disclosed herein is the number of either bit=1 or bit=0, under the single level read operation.

FIG. 1 illustrates a schematic circuit diagram of a memory device 100 including peripheral circuits, according to some aspects of the present disclosure. Memory device 100 can include a memory cell array 101 and peripheral circuits 102 coupled to memory cell array 101. In some implementations, memory cell array 101 can be a NAND Flash memory cell array in which memory cells 106 are provided in the form of an array of three-dimensional (3D) NAND memory strings 108 each extending vertically above a substrate (not shown). In some implementations, each 3D NAND memory string 108 includes a plurality of memory cells 106 coupled in series and stacked vertically. Each memory cell 106 can hold a continuous, analog value, such as an electrical voltage or charge, that depends on the number of electrons trapped within a region of memory cell 106. Each memory cell 106 can be either a floating gate type of memory cell including a floating-gate transistor or a charge trap type of memory cell including a charge-trap transistor. Each array of 3D NAND memory strings 108 can include one or more 3D memory devices.

In some implementations, each memory cell 106 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 106 is a multi-level cell (MLC) that is capable of storing more than a single bit of data in four or more memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state. It is noted that a multi-level architecture in the present disclosure includes an MLC architecture, a TLC architecture, a QLC architecture, or the like, or a combination thereof.

As shown in FIG. 1, each 3D NAND memory string 108 can include a source select transistor 110 at its source end and a drain select transistor 112 at its drain end. Source select transistor 110 and drain select transistor 112 can be configured to activate selected 3D NAND memory strings 108 (columns of the array) during read and program operations. In some implementations, the sources of source select transistors 110 of 3D NAND memory strings 108 in the same block 104 are coupled through a same source line (SL) 114, e.g., a common SL, for example, to the ground. Drain select transistor 112 of each 3D NAND memory string 108 is coupled to a respective bit line 116 from which data can be read or programmed via an output bus (not shown), according to some implementations. In some implementations, each 3D NAND memory string 108 is configured to be selected or unselected by applying a select signal (e.g., a select voltage above the threshold voltage of drain select transistor 112) or a deselect signal (e.g., a deselect voltage such as 0 V) to respective drain select transistor 112 through one or more drain select lines 113 and/or by applying a select voltage (e.g., above the threshold voltage of source select transistor 110) or a deselect voltage (e.g., 0 V) to respective source select transistor 110 through one or more source select lines 115.

As shown in FIG. 1, 3D NAND memory strings 108 can be organized into multiple blocks 104, each of which can have a common source line 114. In some implementations, each block 104 is the basic data unit for erase operations, i.e., all memory cells 106 on the same block 104 are erased at the same time. Memory cells 106 can be coupled through word lines 118 that select which row of memory cells 106 is affected by read and program operations. In some implementations, each word line 118 is coupled to a row of memory cells 106, which is the basic data unit for program and read operations. Each word line 118 can be coupled to a plurality of control gates (gate electrodes) at each memory cell 106 in respective row and a gate line coupling the control gates.

Figure 2:
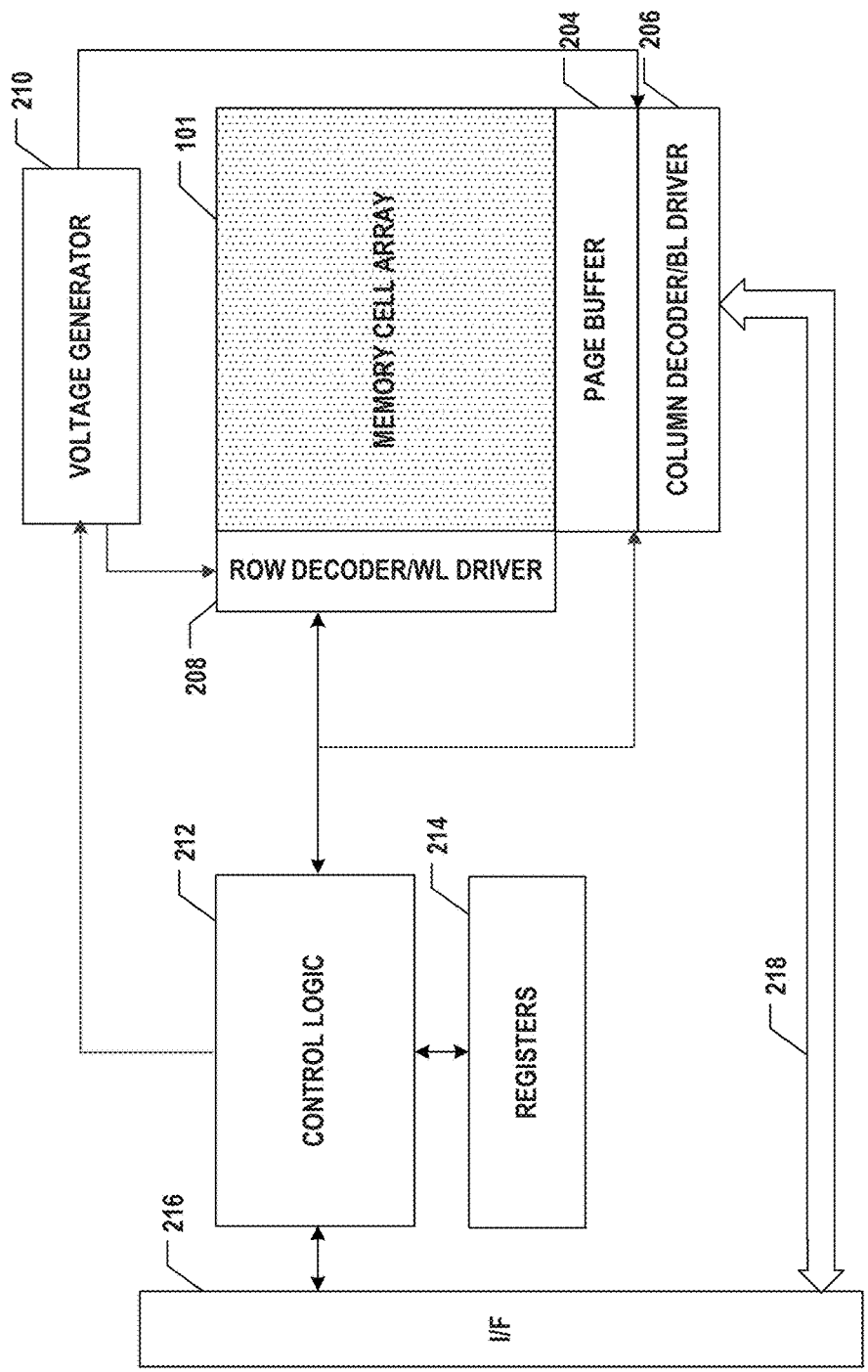
FIG. 2 illustrates a block diagram of an example memory device including a memory cell array and peripheral circuits, according to some implementations of the present disclosure.

Peripheral circuits 102 can be coupled to memory cell array 101 through bit lines 116, word lines 118, source lines 114, source select lines 115, and drain select lines 113. As described above, peripheral circuits 102 can include any suitable circuits for facilitating the operations of memory cell array 101 by applying and sensing voltage signals and/or current signals through bit lines 116 to and from each target memory cell 106 through word lines 118, source lines 114, source select lines 115, and drain select lines 113. Peripheral circuits 102 can include various types of peripheral circuits formed using complementary metal-oxide semiconductor (CMOS) technologies. For example, FIG. 2 illustrates example peripheral circuits 102 including a page buffer 204, a column decoder/bit line driver 206, a row decoder/word line driver 208, a voltage generator 210, control logic 212, registers 214, an interface (I/F) 216, and a data bus 218. It is understood that in some examples, additional peripheral circuits 102 may be included as well.

Page buffer 204 can be configured to buffer data read from or programmed to memory cell array 101 according to the control signals of control logic 212. In one example, page buffer 204 may store one or more pages of program data (write data) to be programmed into one or more rows of memory cell array 101. In another example, page buffer 204 also performs program verify operations to ensure that the data has been properly programmed into memory cells 106 coupled to selected word lines 118. In yet another example, page buffer 204 may also store bit information, bit flip information, offset information, intermediate calculation data, data tables, or other information that is used to implement the methods in the present disclosure.

Row decoder/word line driver 208 can be configured to be controlled by control logic 212 and select or unselect a block 104 of memory cell array 101 and select or unselect a word line 118 of selected block 104. Row decoder/word line driver 208 can be further configured to drive memory cell array 101. For example, row decoder/word line driver 208 may drive memory cells 106 coupled to the selected word line 118 using a word line voltage generated from voltage generator 210. In some implementations, row decoder/word line driver 208 can include a decoder and string drivers (driving transistors) coupled to local word lines and word lines 118.

Voltage generator 210 can be configured to be controlled by control logic 212 and generate the word line voltages (e.g., read voltage, program voltage, pass voltage, local voltage, verification voltage, etc.) to be supplied to memory cell array 101. In some implementations, voltage generator 210 is part of a voltage source that provides voltages at various levels of different peripheral circuits 102 as described below in detail. Consistent with the scope of the present disclosure, in some implementations, the voltages provided by voltage generator 210, for example, to row decoder/word line driver 208 and page buffer 204 are above certain levels that are sufficient to perform the memory operations. For example, the voltages provided to page buffer 204 may be between 2 V and 3.3 V, such as 3.3 V, and the voltages provided to row decoder/word line driver 208 may be greater than 3.3 V, such as between 3.3 V and 30 V.

Column decoder/bit line driver 206 can be configured to be controlled by control logic 212 and select one or more 3D NAND memory strings 108 by applying bit line voltages generated from voltage generator 210. For example, column decoder/bit line driver 206 may apply column signals for selecting a set of N bits of data from page buffer 204 to be output in a read operation.

Control logic 212 can be coupled to each peripheral circuit 102 and configured to control operations of peripheral circuits 102. Registers 214 can be coupled to control logic 212 and include status registers, command registers, and address registers for storing status information, command operation codes (OP codes), and command addresses for controlling the operations of each peripheral circuit 102. Control logic 212 is configured to control the operations in the implementations of the present disclosure.

Interface 216 can be coupled to control logic 212 and configured to interface memory cell array 101 with a memory controller (not shown). In some implementations, interface 216 acts as a control buffer to buffer and relay control commands received from the memory controller and/or a host (not shown) to control logic 212 and status information received from control logic 212 to the memory controller and/or the host. Interface 216 can also be coupled to page buffer 204 and column decoder/bit line driver 206 via data bus 218 and act as an Input/Output (I/O) interface and a data buffer to buffer and relay the program data received from the memory controller and/or the host to page buffer 204 and the read data from page buffer 204 to the memory controller and/or the host. In some implementations, interface 216 and data bus 218 are part of an I/O circuit of peripheral circuits 102.

Figure 3:
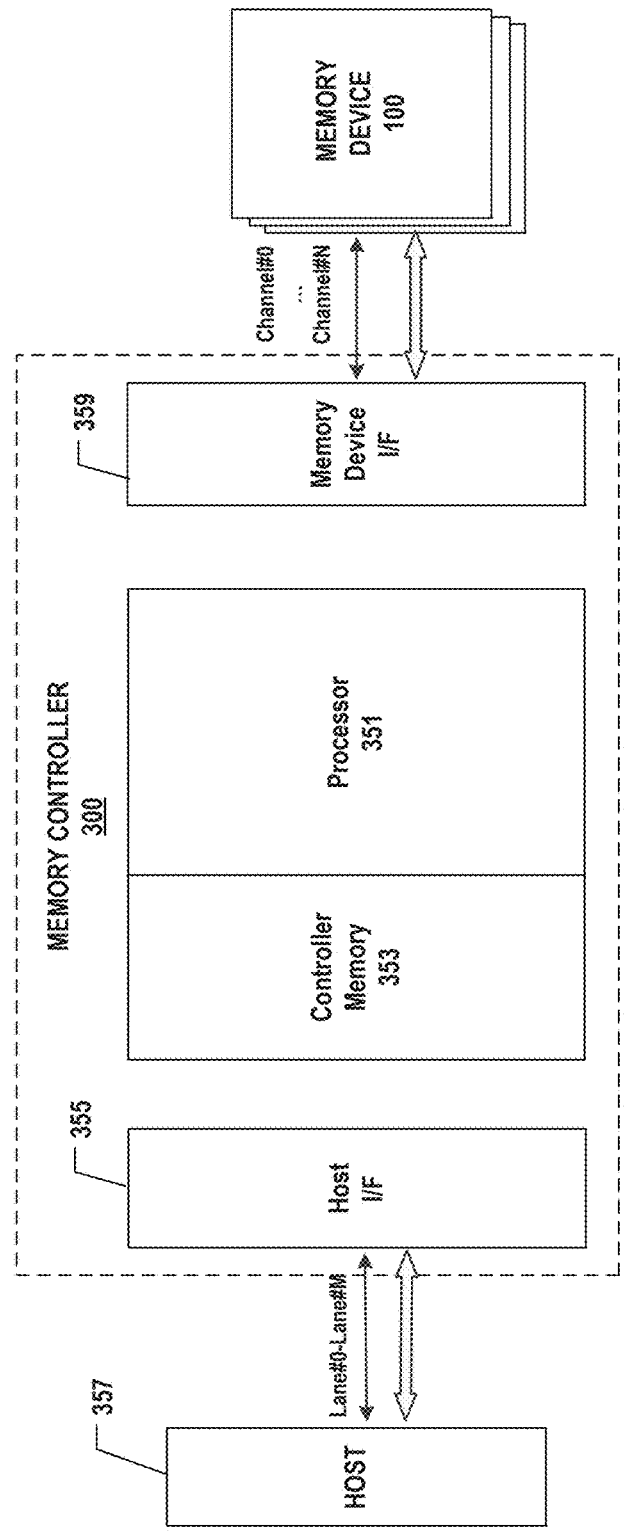
FIG. 3 illustrates a block diagram of an example memory system including a host, a memory controller, and a memory device, according to some implementations of the present disclosure.

FIG. 3 illustrates an example memory system 350 including a host 357, a memory controller 300, and a memory device 100, according to some implementations of the present disclosure. Memory controller 300 includes a microprocessor 351, controller/memory device interface (I/F) 355 coupled between microprocessor 351 and host 357, and controller/memory device interface 359 coupled between microprocessor 351 and memory device 100. Controller/host interface 355 is configured to implement a standard communication protocol including an embedded MultiMedia Card (eMMC), Universal Serial Bus (USB), Universal Flash Storage (UFS), Parallel Advanced Technology Attachment (Parallel ATA or PATA), Serial Advanced Technology Attachment (SATA), etc., for communicating with host 357. Controller/memory device interface 359 is configured to transfer a command into corresponding control signal that controls memory device 100.

Memory controller 300 may manage data stored in memory device 100 and communicate with host 357. Memory controller 300 may be configured to control operations of memory device 100, such as read, erase, program operations, data recovery operations, or other operations according to some implementations of the present disclosure. Memory controller 300 may be configured to control the operations by sending a command (e.g., a read command) or a command with data addresses. In some implementations, memory controller 300 may also include a controller memory 353 (such as a volatile cache memory and/or a non-volatile memory) storing data tables, intermediate calculation information, offset information, verify information, fail bit count information, bit information, bit flip information, or other information in the implementations of the present disclosure. Memory controller 300 may also be configured to manage various functions with respect to data stored or to be stored in memory device 100, including but not limited to bad block management, garbage collection, logical to physical address transfer, and wear leveling. In some implementations, memory controller 300 is also configured to process error correction codes (ECC) with respect to data read from or written to memory device 100. In some implementations, memory controller 300 is also configured to perform or instruct to perform operations including the optimal read voltage determining operation, read retry operation, or other operations in the implementations of the present disclosure. Memory controller 300 may also perform any other suitable function, such as formatting memory device 100. Memory controller 300 may communicate with external devices (e.g., host 357) according to a particular communication protocol. Host 357 may be a processor (e.g., a central processing unit (CPU)) or a system on a chip (SoC) (e.g., an application processor (AP)) of the electronic device. Host 357 may be configured to send data to or receive data from memory device 100 via memory controller 300.

Figure 4:
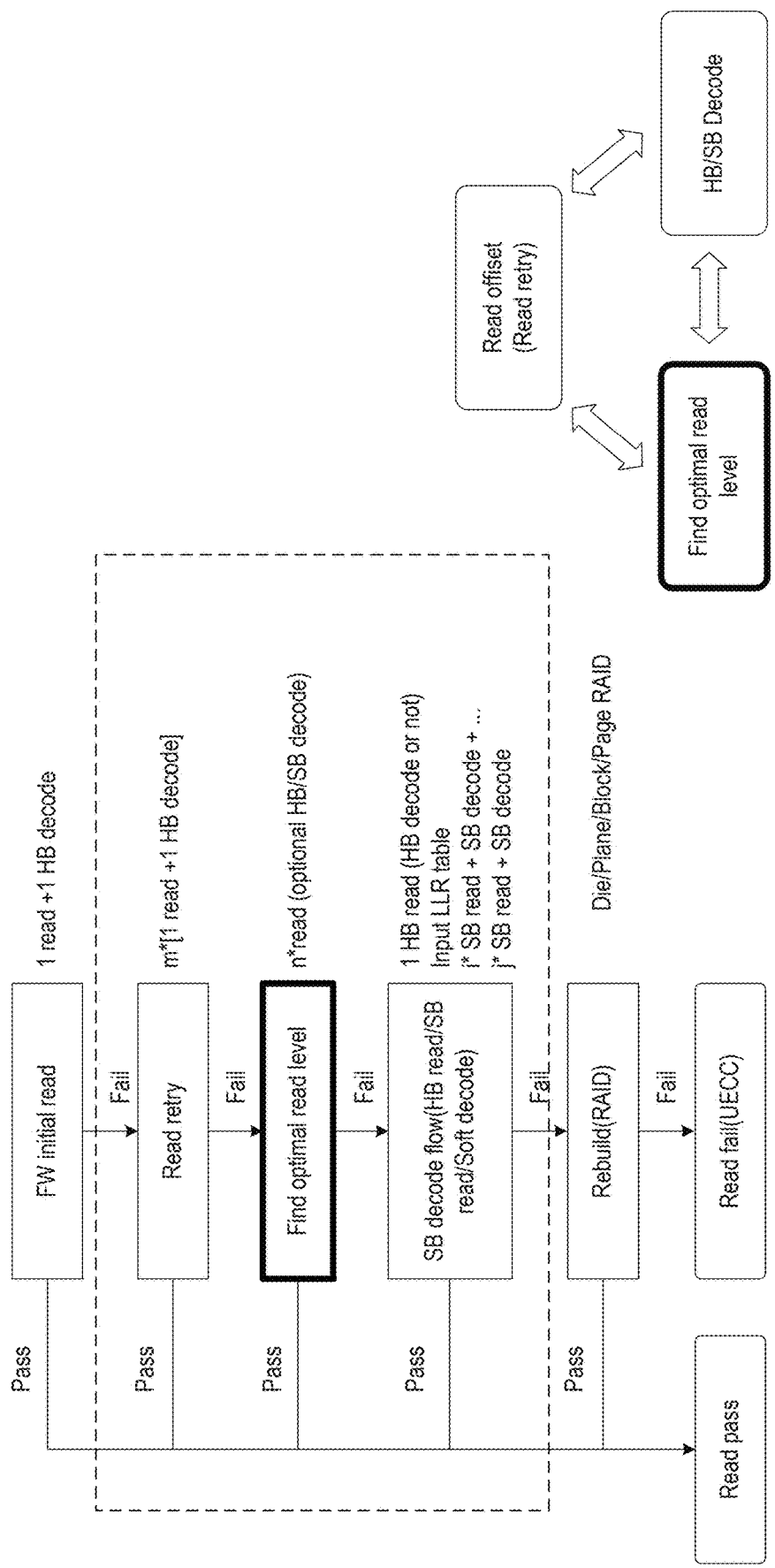
FIG. 4 illustrates a read recovery flowchart during an operation of an example memory system, according to some implementations of the present disclosure.

FIG. 4 illustrates a read recovery flowchart during an operation of an example memory system, according to some implementations of the present disclosure. First, the firmware may instruct memory controller 300 to read with an initial threshold voltage and attempts a hard decoding of read information. If the initial threshold voltage is chosen well such that the initial read passes, the hard decoding will succeed, and the decoded read information is sent to host 357. Otherwise, if the hard decoding fails, the initial read also fails, the firmware may instruct memory controller 300 to perform a read retry operation, an optimal read voltage determining operation, or a combination thereof.

In some implementations, the optimal read voltage determining operation may be performed when the initial read fails. Afterwards, the optimal read voltage determining operation may use a default read voltage of the initial read operation as a first read voltage (i.e., as an initial read voltage of the optimal read voltage determining operation) to start the implementations of the optimal read voltage determining operation. It is noted that the first read voltage in the first read operation in present disclosure may be a single read level voltage in a single read level operation.

In some implementations, the optimal read voltage determining operation may be performed within the read retry operation. For example, during the read retry operation, a read offset voltage may be obtained by checking a read retry table (RRT). The RRT may include a plurality of offset voltage values or include corresponding values that can be calculated to obtain offset voltage values. The offset voltage obtained from the RRT during the read retry operation may be used directly or may be calculated to determine a read retry voltage.

In some implementations, the read retry voltage can be used directly as the first read voltage of the optimal read voltage determining operation to start the implementations of the optimal read voltage determining operation.

In some implementations, the read retry voltage can be used to perform a normal read operation. If the normal read operation passes, no optimal read voltage determining operation is needed. Otherwise, if the normal read operation fails, the read retry voltage is used as the first read voltage of the optimal read voltage determining operation to start the implementations of the optimal read voltage determining operation.

In some implementations, the optimal read voltage determining operation may be performed when the read retry operation fails.

As shown in FIG. 4, the read retry operation may include a read operation and a hard decoding operation for each read retry operation. However, the optimal read voltage determining operation may only require multiple read operations with optional hard decoding or soft decoding operations. Accordingly, the optimal read voltage determining operation, in comparison with the read retry operation, reduces the cost and latency and increases the efficiency in obtaining optimal read voltages for each read level.

To further improve the error correction capability, memory controller 300 may check a log likelihood ratio (LLR) table generated during the characterization of the memory device. The input of LLR provides statistical information of the memory device about the most likely correct values for each data bit. For example, the LLR may provide soft information that determines the probabilities of how likely the received bit ("0" or "1") is flipped or not. These probabilities are taken from LLR tables that have been generated and stored in lookup tables in memory controller 300. This operation may be implemented before, within, or after the read retry operation or the optimal read voltage determining operation.

In some implementations, an ECC mechanism may also be implemented before, within, or after the read retry operation or the optimal read voltage determining operation.

If all the read retry operations and the optimal read voltage determining operations fail, it is determined that the memory cells may be defected (e.g., stuck cells), and thus it is determined that there is an uncorrectable ECC failure (or UECC). A redundant array of independent disks (RAID) and the corresponding components (i.e., die/plane/block/page) may be rebuilt accordingly. For example, the RAID operation may recover a failed component in a RAID stripe by using the remaining successful components in the RAID stripe.

Figures 5C, 5D:
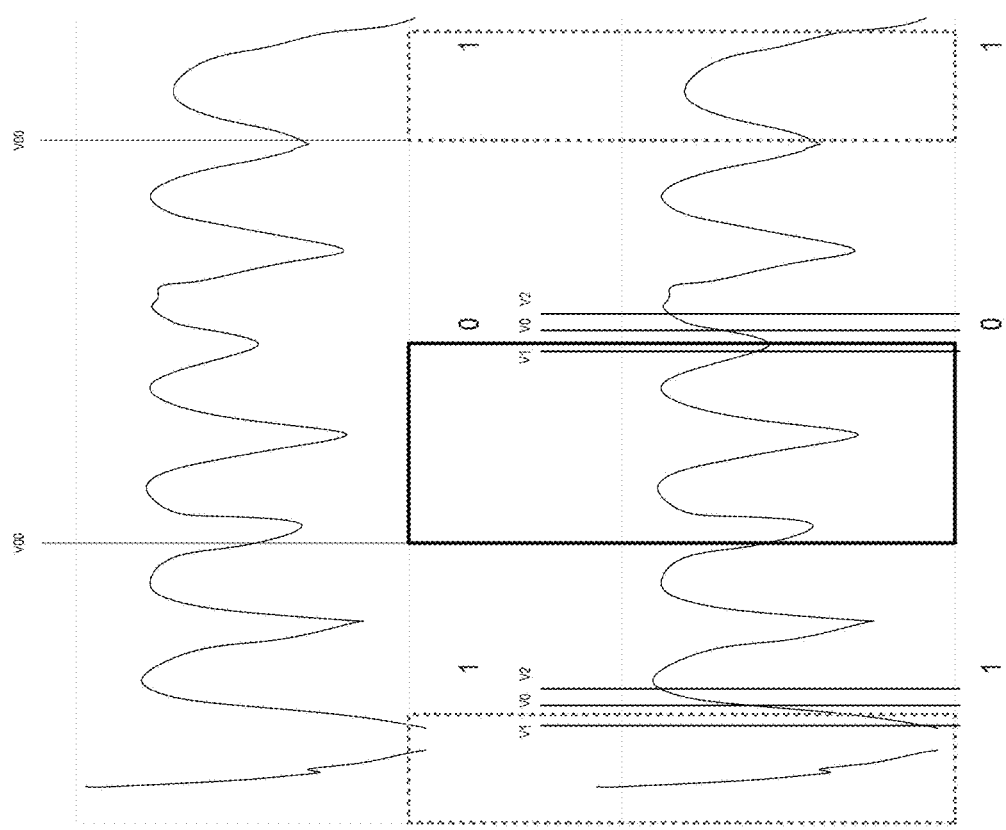
FIG. 5C illustrates a voltage distribution and corresponding bit information showing an example method for determining an optimal read voltage, according to some implementations of the present disclosure.
FIG. 5D illustrates a table showing an example method for determining an optimal read voltage, according to some implementations of the present disclosure.

FIGS. 5A-5D illustrate an example method for determining an optimal read voltage, according to some implementations of the present disclosure. As shown in FIG. 5A, this example uses a TLC NAND as an implementation. It is noted that the implementations in the present disclosure may not be limited to TLC architecture. It can also include MLC or QLC architecture. Because the read operation in this implementation is not a single level read operation, a level indicator is required to identify all types of pages (i.e., lower page (LP), middle page (MP), or upper page (UP)) to which the read operation is applied. For example, the level indicator may be obtained by reading the page information of other page types in the same word line. In a reading operation of a UP, a read voltage of an LP can be used as the level indicator; while in another reading operation of a LP, a read voltage of a UP can be used as the level indicator, such that when bits flip, it can be determined to be the values in different pages.

In FIG. 5B, in an implementation of an optimal read voltage determining operation in LP, a reference voltage V00 of a UP is used as a level indicator, and V0 is the initial read voltage.

Figure 7A:
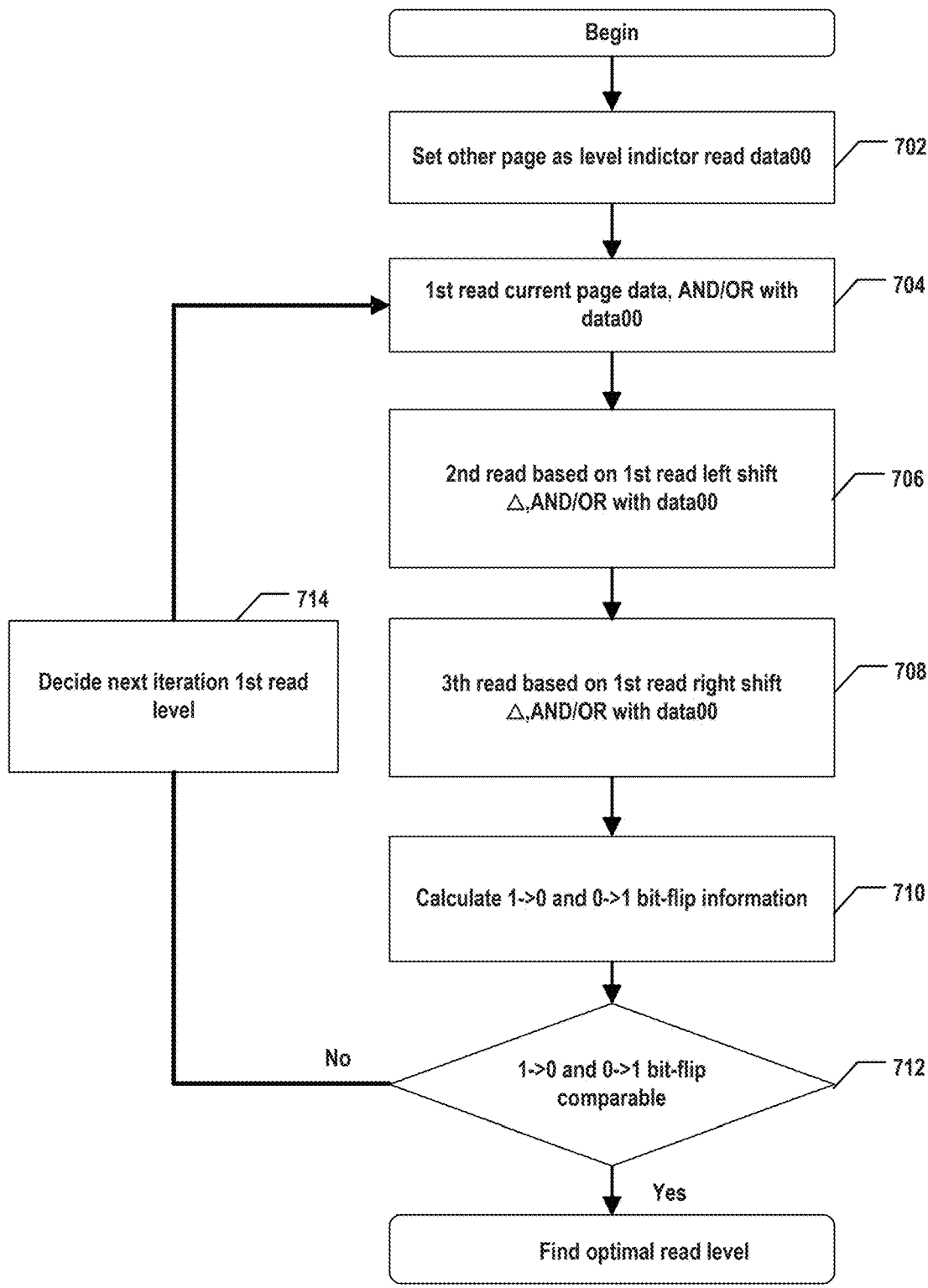
FIG. 7A illustrates a flowchart for determining an optimal read voltage, according to some implementations of the present disclosure.

FIG. 7A illustrates a flowchart of method 700 of determining an optimal read voltage in the example of FIGS. 5A-5D, according to some implementations of the present disclosure.

Method 700 starts at operation 702 in which a UP (i.e., another page that is not the target page) is set as a level indicator with read data00.

Next, referring to operation 704 in which a first read operation is performed on the current page data (i.e., the target page). The LP is read with V0, and thus data0 is obtained; the UP is read with V00, and thus data00 is obtained. An AND operation is performed on data0 and data00 to obtain data_temp0, and an OR operation is performed on data0 and data00 to obtain data_temp1. Next, the bit "1" is counted and stored as the number N01 under data_temp0, and the bit "0" is counted and stored as the number N00 under data_temp1, where N01 corresponds to program state Vrd_p1 while N00 corresponds to program state Vrd_p5.

Next, referring to operation 706 in which read voltage V0 is shifted to V0 plus a first shift value, which is read voltage V1, and data1 is obtained thereafter. An AND operation is performed on data1 and data00 as data_temp2, and an OR operation is performed on data1 and data00 as data_temp3. The bit "1" is counted and stored as the number N11 under data_temp2, and the bit "0" is counted and stored as the number N10 under data_temp3.

Next, referring to operation 708 in which read voltage V0 is shifted to read voltage V0 minus the first shift value, which is read voltage V2, and data2 is obtained thereafter. An AND operation is performed on data2 and data00 as data_temp4, and an OR operation is performed on data2 and data00 as data_temp5. The bit "1" is counted and stored as the number N21 under data_temp4, and the bit "0" is counted and stored as the number N20 under data_temp5.

Next, referring to operation 710 in which, by comparing the value of the bit flip count of 0 to 1 and the bit flip count of 1 to 0, whether the V1 is closer to V0 or whether V2 is closer to V0 is determined at operation 712. That is, if the value of the bit flip count of 0 to 1 is higher than the bit flip count of 1 to 0, then the next read voltage V3 should be determined to shift from V0 toward V1; and if the value of the bit flip count of 1 to 0 is higher than the bit flip count of 0 to 1, then the next read voltage V3 should be determined to shift from V0 toward V2.

In the next iteration, referring to operation 714 in which the next read voltage V3 can be decided and set as a voltage between V1 and V0 or between V2 and V0 after the direction of the voltage shift is determined. For example, the next read voltage V3 can be set as half of the sum of V1 and V0 when the voltage should be shifted toward V1. By repeating the above processes, the optimal read voltage can be found when no more shift is needed. That is, when the value of the bit flip count of 0 to 1 and the bit flip count of 1 to 0 for both sides are equal or the difference between them is less than a threshold, then the next read voltage V3 is determined to be the optimal read voltage for that read level, and no more shift is needed. For example, when a difference between the bit flip count of 1 to 0 and the bit flip count of 0 to 1 is determined to be lower than a threshold (i.e., the bit flip count of 1 to 0 is almost equal to the bit flip count of 0 to 1), the read voltage V3 is determined to be the optimal read voltage for that read level.

Figure 6A:
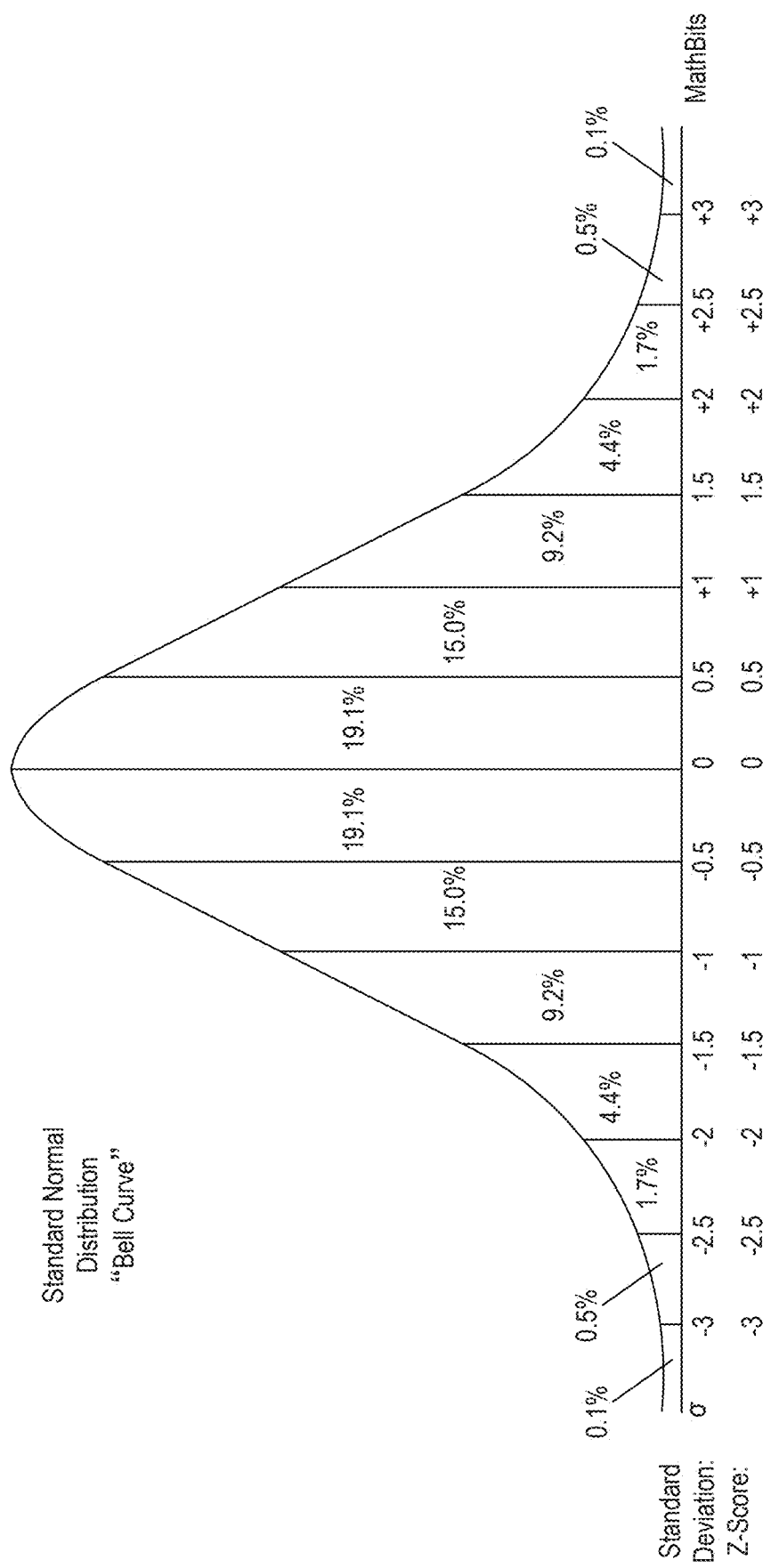
FIG. 6A illustrates a voltage distribution showing an example method for determining an optimal read voltage, according to some implementations of the present disclosure.

FIG. 6A illustrates a voltage distribution showing an example method for determining an optimal read voltage, according to some implementations of the present disclosure. To find the optimal read voltage, a Vth normal distribution can be relied upon such that the bit count distribution can be used to determine the shift of the read voltage. For example, as shown in FIG. 6A, in the left side of the distribution, the voltage offset towards the left has a lower probability than the voltage offset towards the right. That is, the bit count of the voltage that shifts to the left must be lower than the bit count of the voltage that shifts to the right. On the contrary, on the right side of the distribution, the voltage offset towards the left has a higher probability than the voltage offset towards the right. That is, the bit count of the voltage that shifts to the left must be higher than the bit count of the voltage that shifts to the right. By comparing the bit flip information, such as bit flip count, the direction of the voltage shift can be determined, and thus, by iterating these processes, an optimal read voltage (i.e., the bottom of the distribution) can be determined. It is noted that, in some implementations, the bit flip information or bit flip count indicates that the number of bit flips from "0" to "1" or "1" to "0".

Figure 6B:
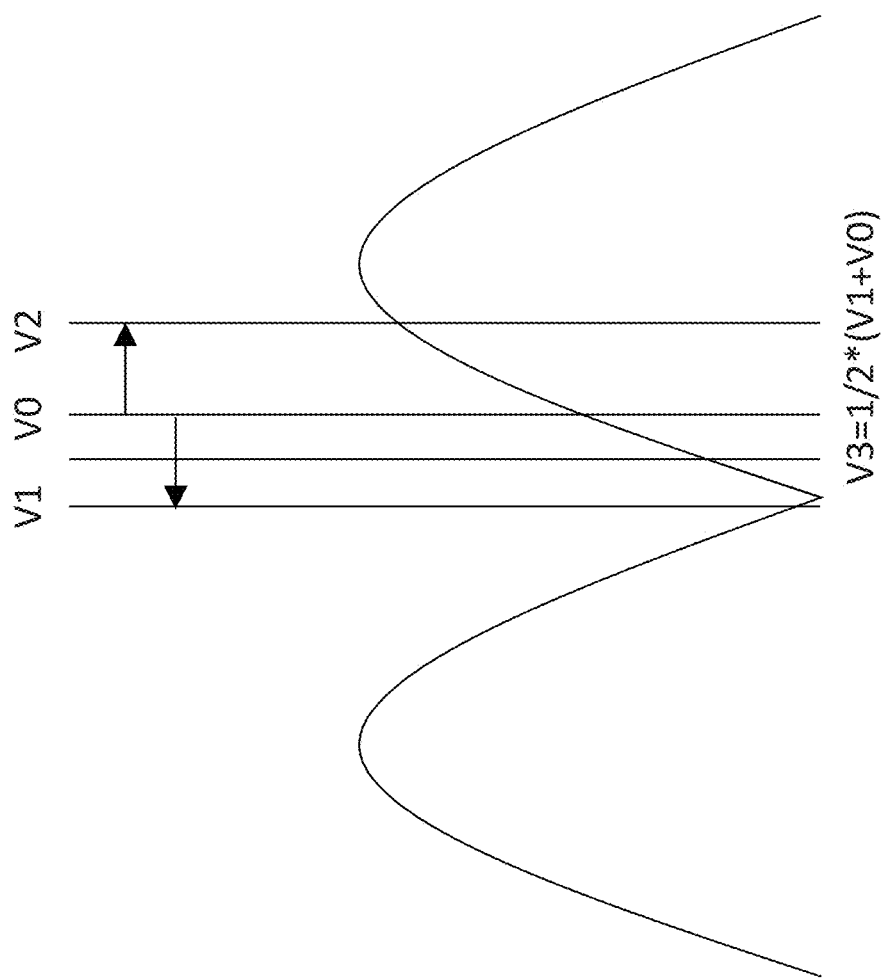
FIG. 6B illustrates a voltage distribution during a read operation showing an example method for determining an optimal read voltage, according to some implementations of the present disclosure.
Figure 6D:
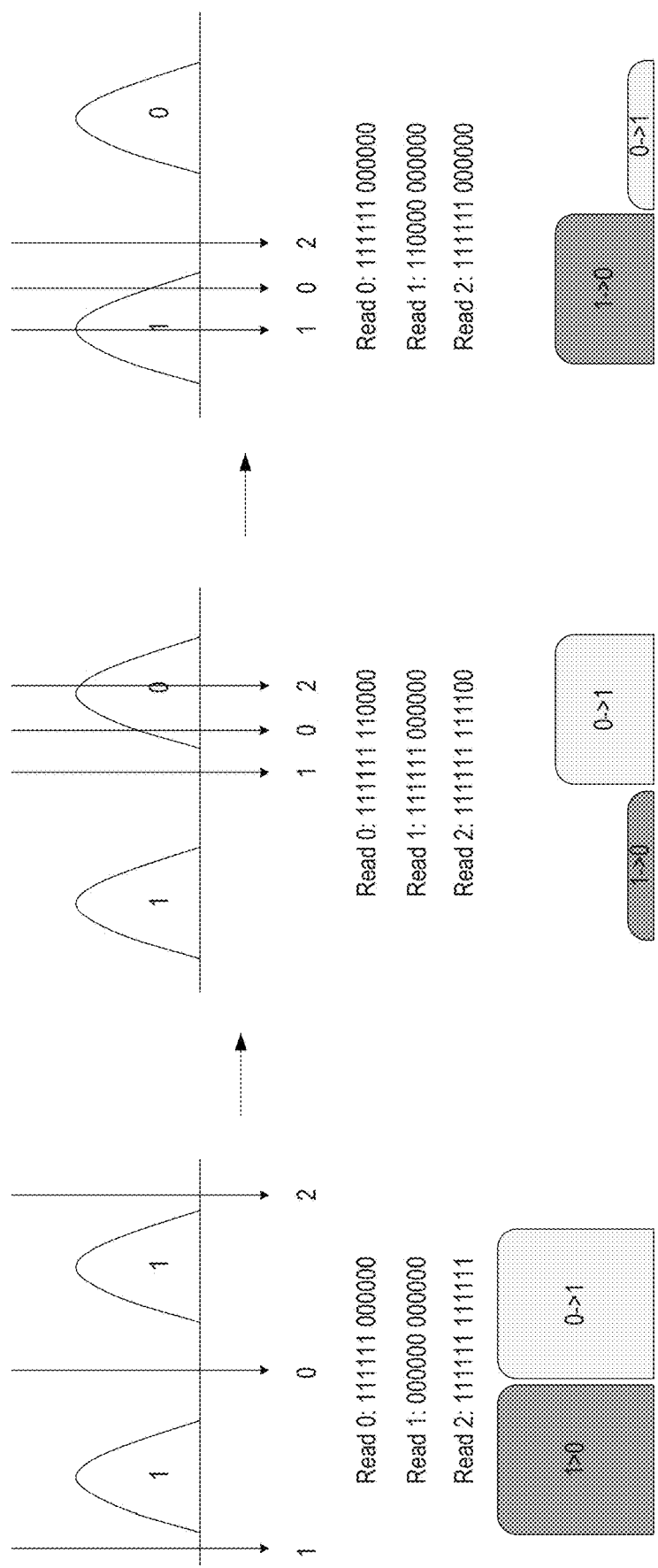
FIG. 6D illustrates a voltage distribution and corresponding bit information during a read operation showing an example method for determining an optimal read voltage, according to some implementations of the present disclosure.
Figure 7B:
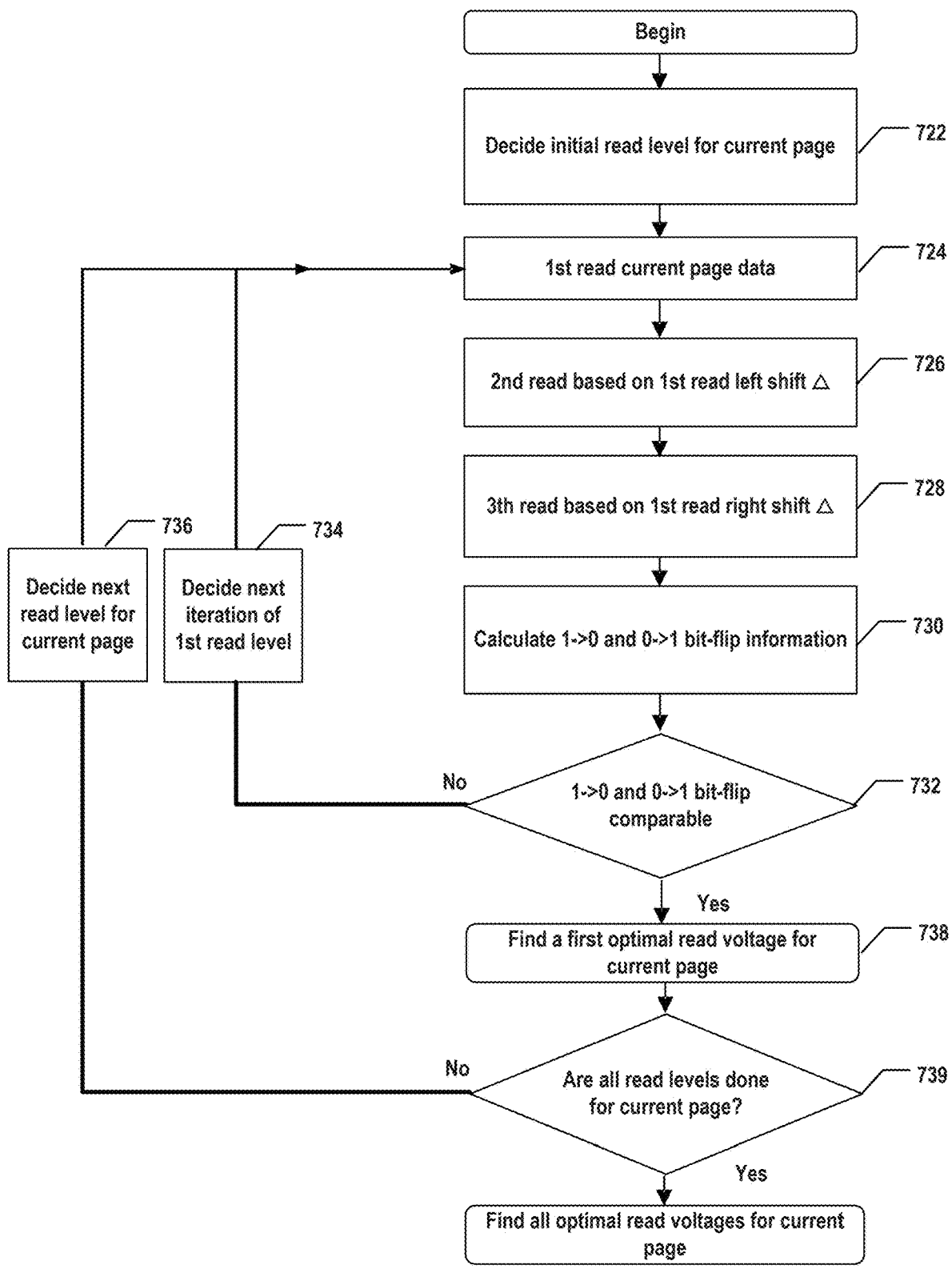
FIG. 7B illustrates a flowchart for determining an optimal read voltage, according to some implementations of the present disclosure.

FIG. 7B illustrates a flowchart of method 720 of determining an optimal read voltage in the example of FIGS. 6A-6D, according to some implementations of the present disclosure. It is noted that the implementation can be performed under a multi-level architecture including an MLC architecture, a TLC architecture, or a QLC architecture.

First, referring to operation 722 in which an initial single level read (SLR) voltage is determined for the current page (i.e., the target page). Unlike the previous example that requires a level indicator for different read levels, the present implementation does not need a level indicator. That is, by using a single level read operation, the optimal read voltage can be determined. For example, the current page can be an LP in a TLC architecture.

Next, referring to operation 724 in which a first read operation is performed on the current page data (i.e., the target page). The current page is read with V0, as shown in FIG. 6B, and the data including the bit count information is obtained thereafter. For example, as shown in FIG. 6C, in the first read operation, the bit count of bit "0" is N00, the bit count of bit "1" is N01. In some implementations, as mentioned above, the initial single level read voltage includes a read retry voltage during the previous read retry operation, or a default read voltage. It is noted that actual bit count data collected is not limited to memory cells of the current page. It can be bit count of target memory cells, a portion memory cells in a target page (e.g., memory cells in at least a program state of the target page), all the memory cells in the target page, memory cells in one or more pages including the target page, all the memory cells in all the pages. It is also noted that the actual bit count data collected may include bit count of a target set of memory cells or a target set of pages, and that a target optimal read voltage is the optimal read voltage of the target set of memory cells or pages. As such, the addresses of the read operation to determine the actual bit count can be the addresses of the corresponding target set of memory cells or pages.

Next, referring to operation 726 in which read voltage V0 is shifted to V0 minus a first shift value, which is read voltage V1 during a second read operation. For example, as shown in FIG. 6C, in the second read operation, the bit count of bit "0" is counted and stored as N10, and the bit count of bit "1" is counted and stored as N11. That is, the bit flip information that bit "0" is switched to "1" can be calculated and obtained. The bit flip information can then be used to determine whether the read voltage Vth should be shifted to the left or right to find the optimal read voltage.

Next, referring to operation 728 in which read voltage V0 is shifted to V0 plus a first shift value, which is read voltage V2 during a third read operation. For example, as shown in FIG. 6C, in the third read operation, the bit count of bit "0" is counted and stored as N20, and the bit count of bit "1" is counted and stored as N21. That is, the bit flip information that bit "0" is switched to "1" or "1" is switched to "0" can be calculated and obtained. The bit flip information is then used to determine whether the read voltage Vth should be shifted to the left or right to find the optimal read voltage.

Next, referring to operation 730 in which the bit flip information that bit "0" is switched to "1" and that bit "1" is switched to "0" are calculated and determined.

Next, referring to operation 732, as mentioned above, when the bit flip information that bit "0" is switched to "1" is larger than the bit flip information that bit "1" is switched to "0", the firmware or memory controller 300 may search the optimal read voltage to the left side. A new read voltage V3 in the next read operation is then determined in operation 734, and the next read operation 724 is repeated thereafter. In some implementations, read voltage V3 may be determined as half of the sum of V0 and V1. In some implementations, read voltage V3 may be determined as any voltage value between V0 and V1, depending on the distribution analysis. And when the bit flip information that bit "0" is switched to "1" is smaller than the bit flip information that bit "1" is switched to "0", the firmware or memory controller 300 may search the optimal read voltage to the right side. A new read voltage V3 in the next read operation is then determined. In some implementations, read voltage V3 may be determined as half of the sum of V0 and V2. In some implementations, read voltage V3 may be determined as any voltage value between V0 and V1, depending on the distribution analysis.

Next, referring to operation 738 in which, by comparing the value of the bit flip information that bit "1" is switched to "0" and that bit "0" is switched to "1", whether the V1 is closer to V0 or whether V2 is closer to V0 is determined. That is, whether the V0 should be shifted toward a direction close to V1 or toward a direction close to V2 can be determined. When the comparison of the value of the bit flip information that bit "1" is switched to "0" and that bit "0" is switched to "1" is equal or less than a threshold, no more shift is needed. Accordingly, it is determined that the read voltage is the optimal read voltage for that read level.

Next, referring to operation 739 in which, after determining one optimal read voltage for one of the read levels in the current page, determine whether all the SLR read for all the read levels done for the current page. If not, the next SLR level on the current page is determined, as in operation 736. A new read voltage is also determined, and thus, another first read operation 724 is started. The flow is repeated until all the SLR levels in the current page have found their respective optimal read voltages.

Figure 7C:
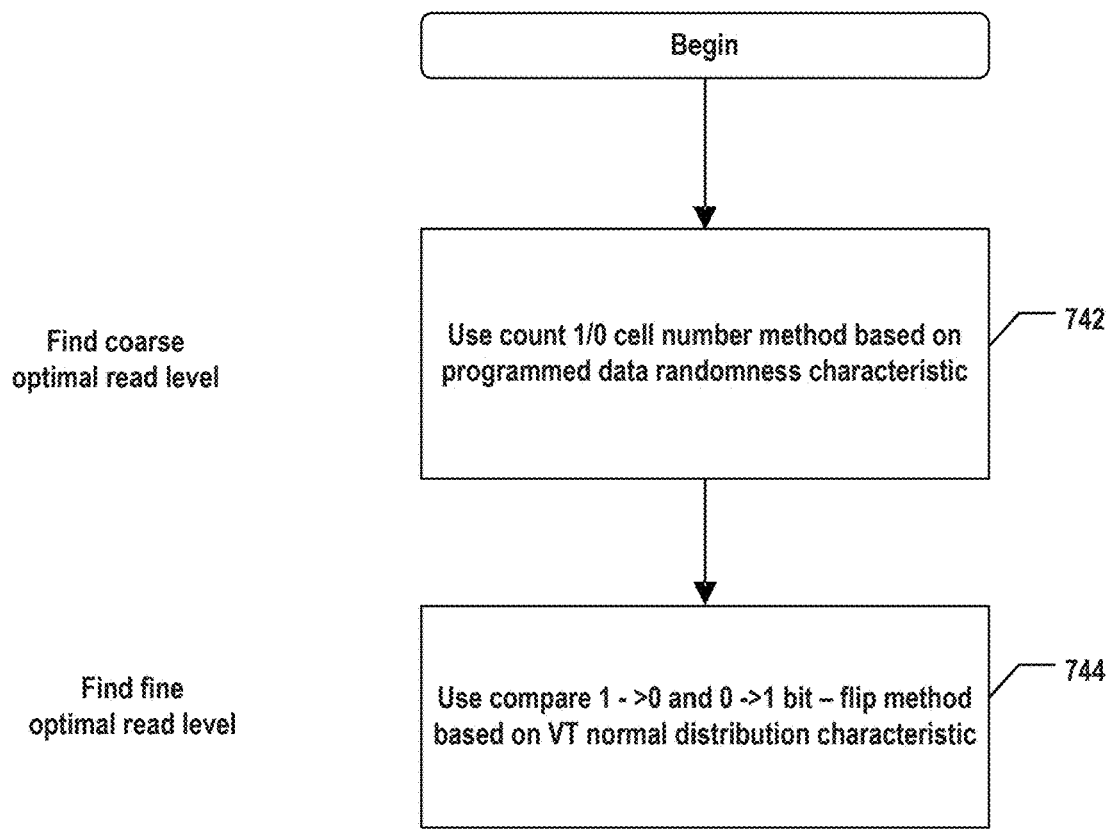
FIG. 7C illustrates a flowchart for determining an optimal read voltage, according to some implementations of the present disclosure.

FIG. 7C illustrates a flowchart of method 740 of determining an optimal read voltage, according to some implementations of the present disclosure. It can start with a coarse optimal read voltage operation, such as in operation 742. Based on the programmed data randomness characteristic, and by using bit counts of bit "0" or "1" that should be ideally equal, each read level should have an expected number of bit count out of the total bit count. For example, in SLC mode, the level L0 and L1 should share the total bit count. That is, each of the level L0 and L1 should have half of the total bit count. As such, by comparison of each expected number of bit count and bit count obtained through a read operation, a voltage shift in the next iteration can be determined. By repeating the processes, a coarse optimal read voltage determining operation can find a coarse optimal read voltage. The coarse optimal read voltage can then be used as a default read voltage or a first read voltage to start a fine optimal read voltage process, as in operation 744. The fine optimal read voltage determining operation is disclosed in detail, for example, in FIG. 7B and corresponding description.

Figure 9A:
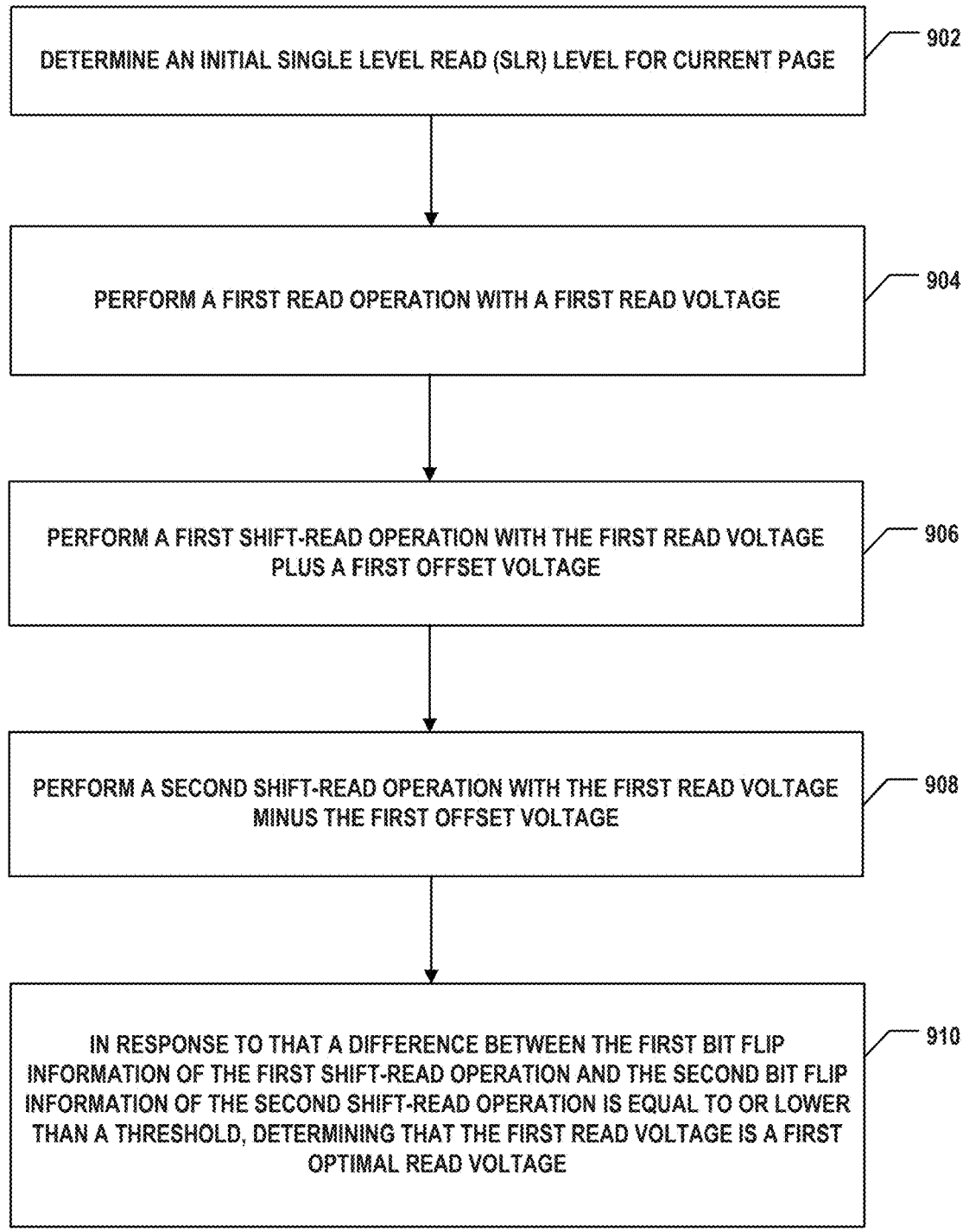
FIG. 9A illustrates a flowchart for determining an optimal read voltage, according to some implementations of the present disclosure.

FIG. 9A illustrates a flowchart of method 900 for determining an optimal read voltage, according to some implementations of the present disclosure.

Method 900 starts at operation 902 in which an initial SLR level for the current page is determined. The initial SLR level, which is a first read level is determined. For example, a program level P1 in a current page LP can be determined to be the first read level of the current page LP, and a program level P5 in the current page LP can be determined to be the second read level of the current page LP.

Referring to operation 904 in which a first read operation is performed with a first read voltage of the first read level. In some implementations, as mentioned above, the initial single level read voltage includes a read retry voltage during the previous read retry operation, a default read voltage, or any optimal read voltage obtained in the present disclosure.

Referring to operation 906 in which a first shift-read operation is performed with the first read voltage plus a first offset voltage. In some implementations, the first offset voltage can be determined according to the threshold voltage normal distribution characteristic or the read margin of the memory device. The threshold voltage normal distribution characteristic or the read margin of the memory device can be determined by multiple re For example, the first offset voltage can be between 0.01 and 1.0 V. It is noted that the lower the first offset voltage is (i.e., the smaller a shift step is), the more iterations the optimal read voltage determining operation may need.

Referring to operation 908 in which a second shift-read operation is performed with the first read voltage minus the first offset voltage.

Referring to operation 910 in which, in response to that a difference between first bit flip information of the first shift-read operation and second bit flip information of the second shift-read operation is equal to or lower than a threshold, the first read voltage is determined to be a first optimal read voltage. On the contrary, in response to that the difference between the first bit flip information of the first shift-read operation and the second bit flip information of the second shift-read operation is higher than the threshold, determining that the first read voltage is not the first optimal read voltage.

After determining that the first read voltage is not the first optimal read voltage, method 900 may start to perform a second read operation with a second read voltage, where the second read voltage is determined based on a difference between the first bit flip information of the first shift-read operation and the second bit flip information of the second shift-read operation. In particular, in response to that the first bit flip information of the first shift-read operation is higher than the second bit flip information of the second shift-read operation, the second read voltage is determined to be higher than the first read voltage, and in response to that the first bit flip information of the first shift-read operation is lower than the second bit flip information of the second shift-read operation, the second read voltage is determined to be lower than the first read voltage. In some implementations, in response to that the first bit flip information of the first shift-read operation is higher than the second bit flip information of the second shift-read operation, and the second read voltage is determined to be the first read voltage minus half of the first offset voltage, and in response to that the first bit flip information of the first shift-read operation is lower than the second bit flip information of the second shift-read operation, the second read voltage is determined to be the first read voltage plus half of the first offset voltage. By approaching the optimal read voltage with multiple iterations, the optimal read voltage for the current page can be found.

In some implementations, the first bit flip information of the first shift-read operation is determined by a first bit flip count between the first shift-read operation and the first read operation, and the second bit flip information of the second shift-read operation is determined by a second bit flip count between the second shift-read operation and the first read operation. These detailed calculations can be referred to as implementations in FIGS. 6A-6D and 7B.

In some implementations, method 900 may further include, in response to determining that the first read voltage is the first optimal read voltage for a first page, determining a second single level read level for the current page. Once all the optimal read voltages of all the respective read levels of the current page are determined, it may start to perform the same on the next page.

In some implementations, after all the optimal read voltages of all the respective read levels of the current page are determined, method 900 may further include performing a normal read operation based on all the optimal read voltages for the current page. It is noted that the normal read operation is not the single level read operation.

Figure 9B:
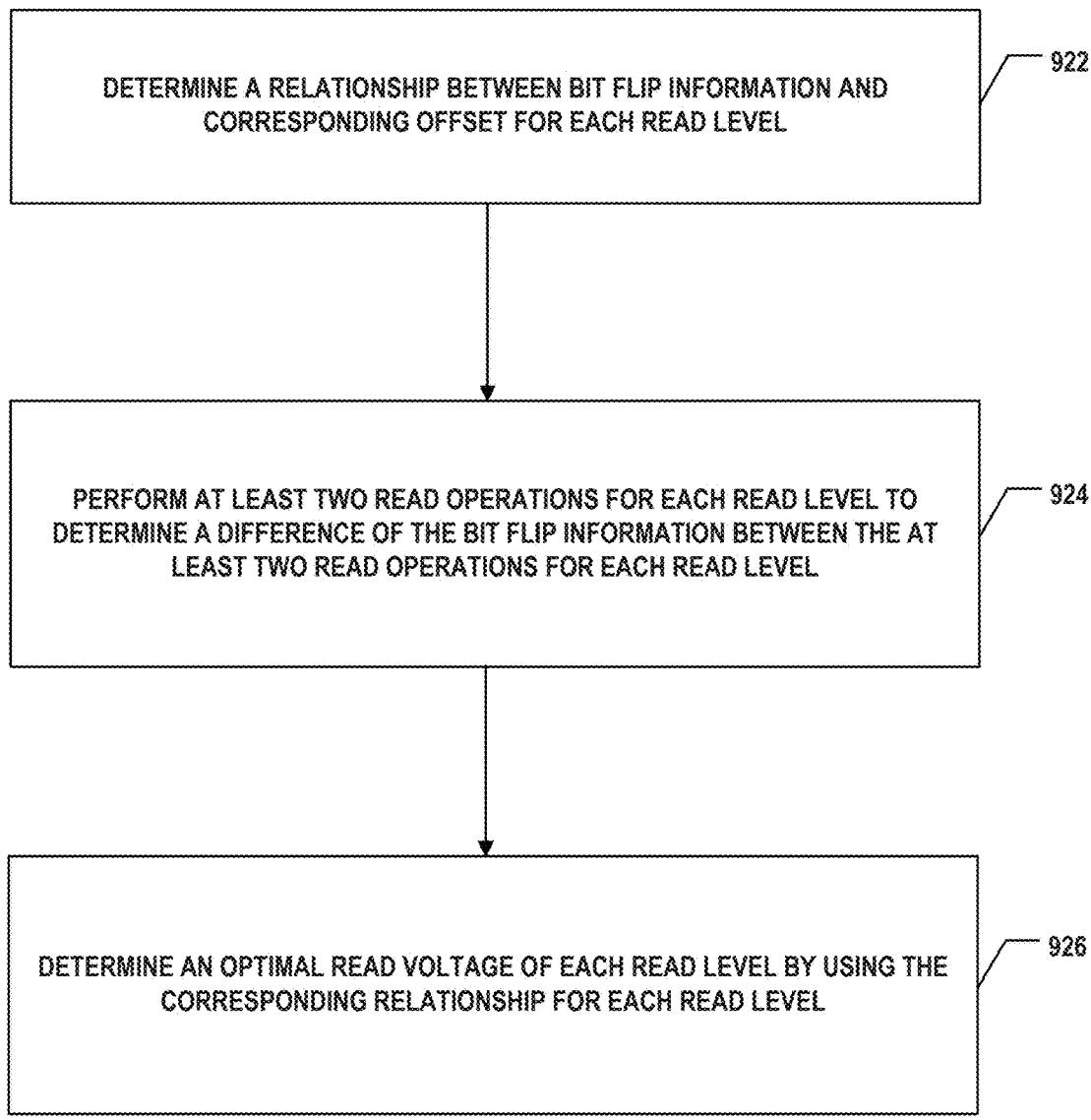
FIG. 9B illustrates a flowchart for determining an optimal read voltage, according to some implementations of the present disclosure.

FIG. 9B illustrates a flowchart of method 920 for determining an optimal read voltage, according to some implementations of the present disclosure.

Figure 8A:
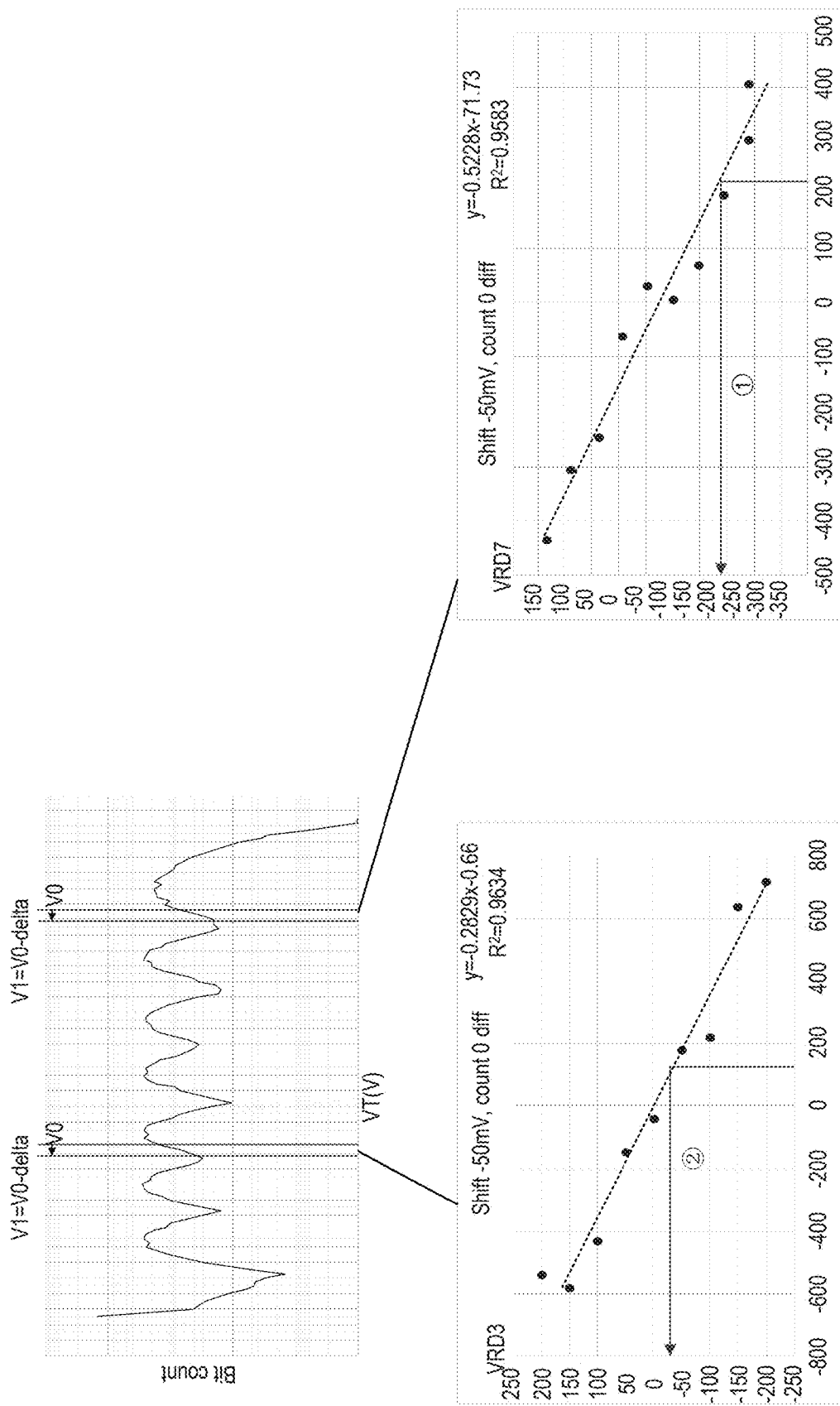
FIG. 8A illustrates a voltage distribution and corresponding relationship between read offset and bit count number during a read operation, according to some implementations of the present disclosure.

Method 920 starts at operation 922 in which a relationship between bit flip information and corresponding offset for each read level of the current page is determined. As shown in FIG. 8A, a voltage distribution of read levels (e.g., a read level between program state P2 and P3 and a read level between P6 and P7) and corresponding relationships between read offset and bit count number in each read level are obtained and calculated or determined based on big data analysis of the memory device.

In some implementations, the big data analysis can be done by: (1) reading all the bit count information of all the corresponding Vth of NAND; (2) defining an estimated range for each read level; (3) calculating the delta value, which includes using a difference between two bit count information of two corresponding Vth; (4) calculating the relationship between the delta value and the offset of optimal read voltage for each read level; and (5) storing the relationship in the firmware. When calculating the relationship, at least two single level read operations are performed to obtain a delta value. As such, by using the relationship and the delta value obtained, the optimal read voltage can be determined. It is noted that the bit count information includes the number of bit counts or the number of bit counts being processed or biased.

Referring to operation 924 in which at least two read operations for each read level of the current page are performed to determine a difference of the bit flip information between the at least two read operations for each read level. In some implementations, method 920 includes performing a first pre-read operation with a first pre-read voltage V0 and a second pre-read operation with a second pre-read voltage V1 to determine a first pre-read bit flip information (e.g., a first shift bit count). Based on the first pre-read bit flip information and a first relationship (e.g., a linear relationship) between bit flip information and read offset in the first read level, a first read offset is determined. Then, by using the first read offset and the first pre-read voltage V0, the first optimal read voltage is determined, as in operation 926. It is noted that the first read offset is an estimated offset (e.g., a left or right shift in read voltage) of voltage toward the optimal read voltage that is to be determined. The first optimal read voltage can be used as the first read voltage in other implementations of the above-mentioned optimal read voltage determining operation (e.g., the optimal read voltage determining operation shown in FIGS. 6A-6D, and 7B). This will significantly reduce the number of iterations in other optimal read voltage determining operations.

In some implementations, more than two pre-read operations are used. For example, method 920 may include performing a first pre-read operation with a first pre-read voltage, and a second pre-read operation with a second pre-read voltage to determine a first pre-read bit flip information; performing the first pre-read operation with the first pre-read voltage, and a third pre-read operation with a third pre-read voltage to determine a second pre-read bit flip information; and based on a difference between the first pre-read bit flip information and the second pre-read bit flip information, and a first relationship (e.g., a linear relationship) between the difference and read offset in the first read level, determining a first read offset. Then, by using the first read offset and the first pre-read voltage V0, the first optimal read voltage is determined, as in operation 926.

Figure 8B:
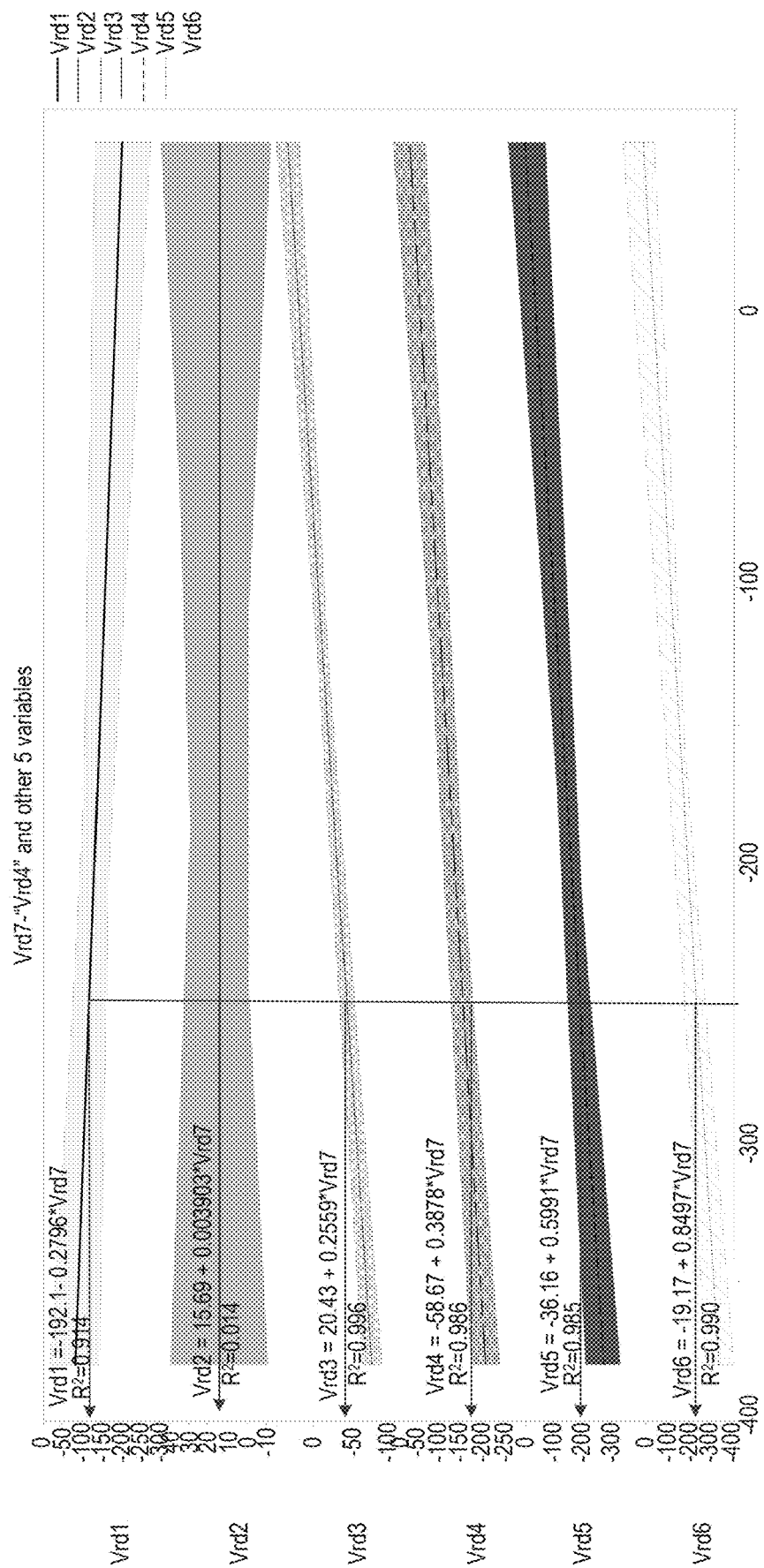
FIG. 8B illustrates a relationship in different optimal read voltage levels, according to some implementations of the present disclosure.

Once one of the read levels (e.g., the first read level of the first page) is determined, as shown in FIG. 8B, the relationship in the current read level of the current page can be further used to map to other read levels of the current page. For example, the relationships of other read levels of the first page can be determined by using the first relationship of the first read level of the first page.

Figure 9C:
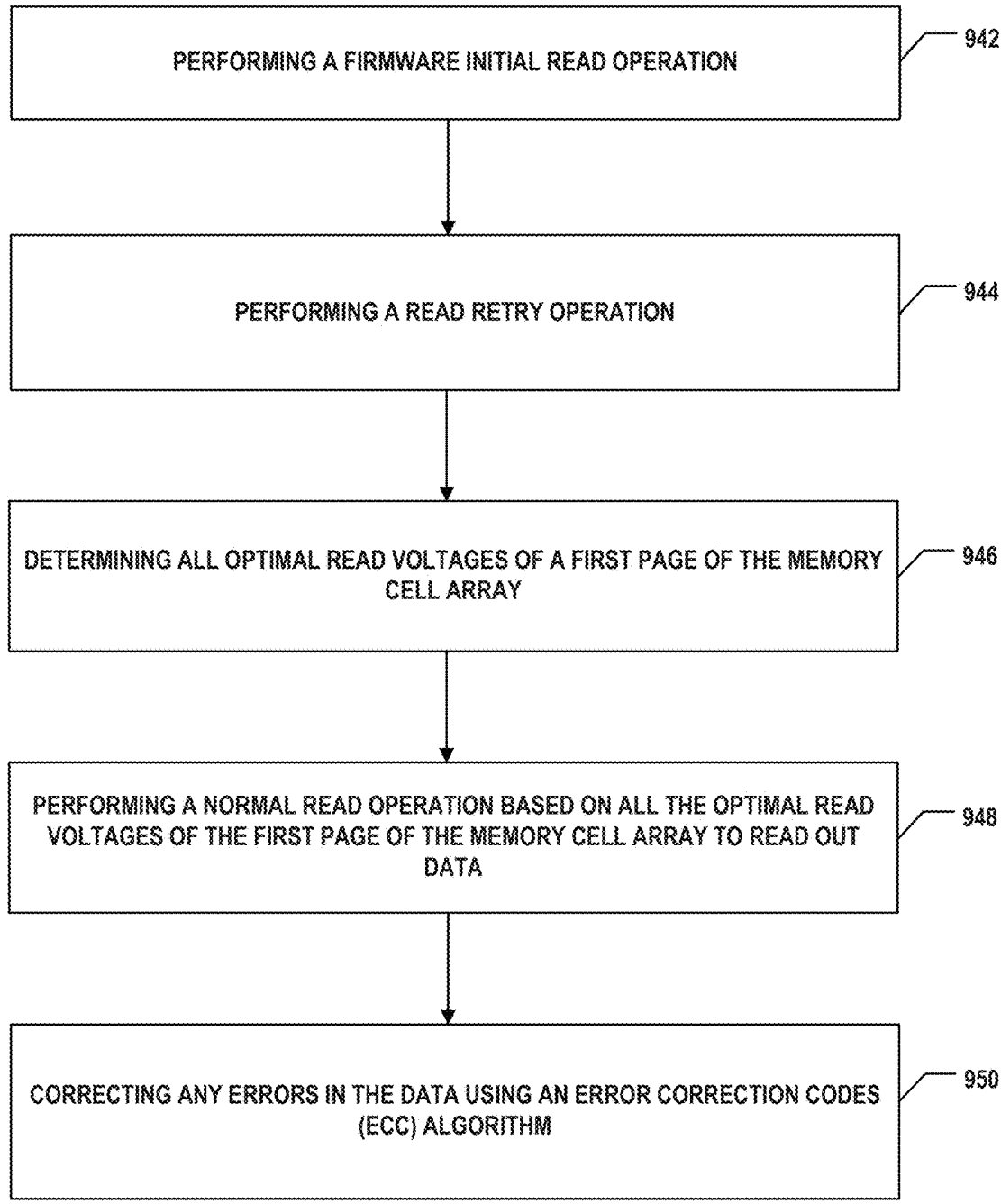
FIG. 9C illustrates a flowchart for determining an optimal read voltage, according to some implementations of the present disclosure.

FIG. 9C illustrates a flowchart of method 940 for read recovery, according to some implementations of the present disclosure. Method 940 starts at operation 942 in which a firmware initial read operation is performed. If the firmware initial read operation fails, method 940 proceeds to operation 944 in which a read retry operation is performed. Next, if the read retry operation fails, method 940 proceeds to operation 946 in which all optimal read voltages of a first page of the memory cell array are determined. It is noted that, as mentioned above, the optimal read voltage determining operation can be performed before, within, or after the read retry operation. The optimal read voltage found in the read retry operation can be used as an initial read voltage in the optimal read voltage determining operation, and vice versa. Accordingly, the optimal read voltage can be determined as precisely as possible without reducing the overall performance of the memory device. Next, method 940 proceeds to operation 948 in which a normal read operation is performed based on all the optimal read voltages of the first page of the memory cell array to read out data. Next, method 940 proceeds to operation 950 in which error correction codes (ECC) are used to detect and correct any errors in the data. It is noted that the ECC can also be performed before, within, or after the read retry operation.

Figure 10:
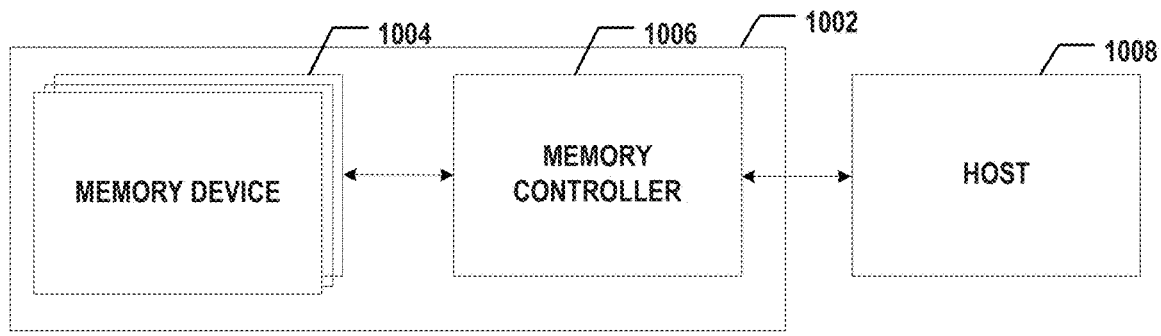
FIG. 10 illustrates a block diagram of an example system having a memory device, according to some implementations of the present disclosure.

FIG. 10 illustrates a block diagram of a system 1000 having a memory device, according to some aspects of the present disclosure. System 1000 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 10, system 1000 can include a host 1008 and a memory system 1002 having one or more memory devices 1004 and a memory controller 1006. Host 1008 can be a processor of an electronic device, such as a central processing unit (CPU), or a system-on-chip (SoC), such as an application processor (AP). Host 1008 can be configured to send or receive the data to or from memory device 1004.

Memory devices 1004 can be any memory devices disclosed herein, such as memory devices 100. In some implementations, each memory device 1004 includes a memory device, as described above in detail.

Memory controller 1006 is coupled to memory device 1004 and host 1008 and is configured to control memory device 1004, according to some implementations. Memory controller 1006 can be any memory controller disclosed herein, such as memory controller 300. In some implementations, each memory controller 1006 includes a memory controller, as described above in detail. Memory controller 1006 can manage the data stored in memory device 1004 and communicate with host 1008. In some implementations, memory controller 1006 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 1006 is designed for operating in a high duty-cycle environment SSDs or embedded multi-media-cards (eMMCs) used as data storage for mobile devices, such as smartphones, tablets, laptop computers, etc., and enterprise storage arrays. Memory controller 1006 can be configured to control operations of memory device 1004, such as read, erase, and program operations. Memory controller 1006 can also be configured to manage various functions with respect to the data stored or to be stored in memory device 1004 including, but not limited to bad-block management, garbage collection, logical-to-physical address conversion, wear leveling, etc. In some implementations, memory controller 1006 is further configured to process error correction codes (ECCs) with respect to the data read from or written to memory device 1004. Any other suitable functions may be performed by memory controller 1006 as well, for example, formatting memory device 1004. Memory controller 1006 can communicate with an external device (e.g., host 1008) according to a particular communication protocol. For example, memory controller 1006 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 11A:
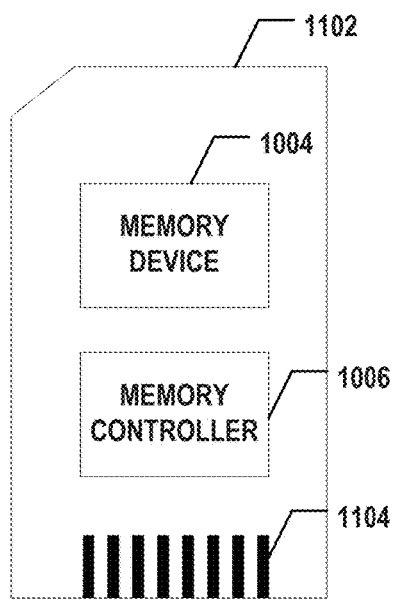
FIG. 11A illustrates a diagram of an example memory card having a memory device, according to some implementations of the present disclosure.
Figure 11B:
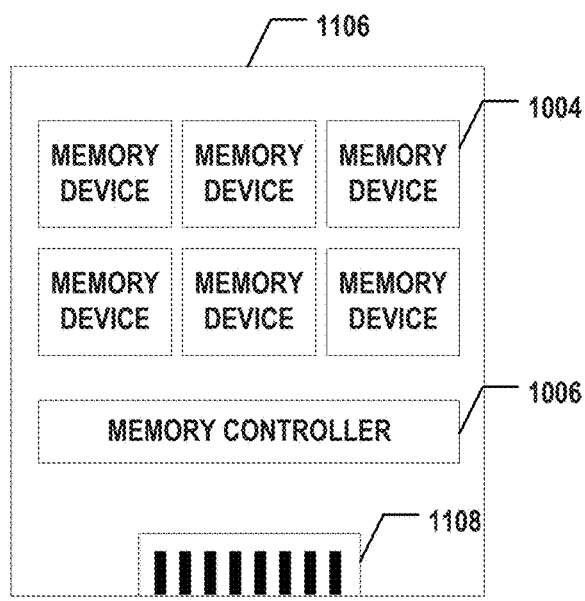
FIG. 11B illustrates a diagram of an example solid-state drive (SSD) having a memory device, according to some implementations of the present disclosure.

Memory controller 1006 and one or more memory devices 1004 can be integrated into various types of storage devices, for example, be included in the same package, such as a universal Flash storage (UFS) package or an eMMC package. That is, memory system 1002 can be implemented and packaged into different types of end electronic products. In one example as shown in FIG. 11A, memory controller 1006 and a single memory device 1004 may be integrated into a memory card 1102. Memory card 1102 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 1102 can further include a memory card connector 1104 coupling memory card 1102 with a host (e.g., host 1008 in FIG. 10). In another example as shown in FIG. 11B, memory controller 1006 and multiple memory devices 1004 may be integrated into an SSD 1106. SSD 1106 can further include an SSD connector 1108 coupling SSD 1106 with a host (e.g., host 1008 in FIG. 10). In some implementations, the storage capacity and/or the operation speed of SSD 1106 is greater than those of memory card 1102.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method of operating a memory system, comprising:
   performing a first read operation on target memory cells with a first read voltage of a first single read level;
   performing a first shift-read operation on the target memory cells with the first read voltage plus a first offset voltage;
   performing a second shift-read operation on the target memory cells with the first read voltage minus the first offset voltage; and
   in response to that a difference between first bit flip information of the first shift-read operation and second bit flip information of the second shift-read operation is equal to or lower than a threshold, determining that the first read voltage is a first optimal read voltage, wherein the first single read level of a first page is under a multi-level architecture, wherein the first bit flip information and the second bit flip information each comprise a bit flip count indicating that a number of bits that have transitioned from a "0" to a "1" state or from a "1" to a "0" state between read operations.

2. The method of claim 1, further comprising:
   in response to that the difference between the first bit flip information of the first shift-read operation and the second bit flip information of the second shift-read operation is higher than the threshold, determining that the first read voltage is not the first optimal read voltage.

3. The method of claim 2, wherein after determining that the first read voltage is not the first optimal read voltage, the method further comprises:
   performing a second read operation on the target memory cells with a second read voltage, wherein the second read voltage is determined based on the difference between the first bit flip information of the first shift-read operation and the second bit flip information of the second shift-read operation.

4. The method of claim 3, wherein the second read voltage is determined based on the difference between the first bit flip information of the first shift-read operation and the second bit flip information of the second shift-read operation further comprises:
   in response to that the first bit flip information of the first shift-read operation is higher than the second bit flip information of the second shift-read operation, the second read voltage is determined to be higher than the first read voltage; and
   in response to that the first bit flip information of the first shift-read operation is lower than the second bit flip information of the second shift-read operation, the second read voltage is determined to be lower than the first read voltage.

5. The method of claim 4, wherein:
   in response to that the first bit flip information of the first shift-read operation is higher than the second bit flip information of the second shift-read operation, the second read voltage is determined to be the first read voltage minus half of the first offset voltage; and
   in response to that the first bit flip information of the first shift-read operation is lower than the second bit flip information of the second shift-read operation, the second read voltage is determined to be the first read voltage plus half of the first offset voltage.

6. The method of claim 1, wherein the first bit flip information of the first shift-read operation is determined by a first bit flip count between the first shift-read operation and the first read operation, and the second bit flip information of the second shift-read operation is determined by a second bit flip count between the second shift-read operation and the first read operation.

7. The method of claim 1, wherein before performing a first read operation on target memory cells with a first read voltage, the method further comprises:
   determining the first single read level.

8. The method of claim 7, wherein in response to determining that the first read voltage is the first optimal read voltage, the method further comprises:
   determining a second single read level.

9. The method of claim 1, wherein determining whether the first read voltage is the first optimal read voltage is further based on a threshold voltage normal distribution characteristic.

10. The method of claim 9, wherein in response to determining all optimal read voltages, the method further comprises:
    performing a normal-read operation on the target memory cells based on all the optimal read voltages.

11. The method of claim 1, further comprising:
    performing a first pre-read operation on the target memory cells with a first pre-read voltage and a second pre-read operation with a second pre-read voltage to determine a first pre-read bit flip information, wherein the first pre-read bit flip information comprises a bit flip count indicating that a number of bits that have transitioned from a "0" to a "1" state or from a "1" to a "0" state between read operations;
    based on the first pre-read bit flip information and a first relationship between bit flip information and read offset in the first single read level, determining a first read offset; and
    determining a first optimal read voltage based on the first pre-read voltage and the first read offset.

12. The method of claim 11, further comprising:
    determining a second read voltage based on a second single read level using the first relationship of the first single read level.

13. The method of claim 1, further comprising:
    performing a first pre-read operation on the target memory cells with a first pre-read voltage, and a second pre-read operation with a second pre-read voltage to determine a first pre-read bit flip information, wherein the first pre-read bit flip information comprises a bit flip count indicating that a number of bits that have transitioned from a "0" to a "1" state or from a "1" to a "0" state between read operations;

based on the first pre-read bit flip information in the first single read level, determining a first read offset;

determining other read offsets based on the first read offset; and determining the first read voltage based on the first pre-read voltage and the first read offset.

14. The method of claim 13, wherein the first pre-read voltage and the second pre-read voltage in the first single read level of the first page are under the multi-level architecture.

15. The method of claim 1, further comprising:

performing a first pre-read operation on the target memory cells with a first pre-read voltage, and a second pre-read operation with a second pre-read voltage to determine first pre-read bit flip information;

performing the first pre-read operation on the target memory cells with the first pre-read voltage, and a third pre-read operation with a third pre-read voltage to determine second pre-read bit flip information, wherein the first pre-read bit flip information and the second pre-read bit flip information each comprise a bit flip count indicating that a number of bits that have transitioned from a "0" to a "1" state or from a "1" to a "0" state between read operations;

based on a difference between the first pre-read bit flip information and the second pre-read bit flip information, and a first relationship between difference in bit flip information and read offset in the first single read level, determining a first read offset; and determining the first read voltage based on the first pre-read voltage and the first read offset.

16. A memory device, comprising:

a memory cell array comprising memory cells; and a peripheral circuit coupled to the memory cell array, wherein the peripheral circuit is configured to:

apply a first read voltage to target memory cells in a first read operation;

apply the first read voltage plus a first offset voltage to the target memory cells in a first shift-read operation;

apply the first read voltage minus the first offset voltage to the target memory cells a second shift-read operation;

in response to that a first bit flip information of the first shift-read operation is higher than a second bit flip information of the second shift-read operation, apply the first read voltage minus half of the first offset voltage, wherein the first bit flip information and the second bit flip information each comprise a bit flip count indicating that a number of bits that have transitioned from a "0" to a "1" state or from a "1" to a "0" state between read operations; and in response to that the first bit flip information is lower than the second bit flip information, apply the first read voltage plus half of the first offset voltages.

17. The memory device of claim 16, wherein the peripheral circuit is further configured to:

store the first bit flip information of the first shift-read operation and the second bit flip information of the second shift-read operation in a page buffer of the peripheral circuit or the memory cell array.

18. A memory system, comprising:

a memory device; and a memory controller coupled to the memory device, wherein the memory device comprises:

a memory cell array comprising memory cells; and a peripheral circuit coupled to the memory cell array, wherein the memory controller is configured to:

instruct the peripheral circuit to perform a first read operation on target memory cells with a first read voltage of a first single read level;

instruct the peripheral circuit to perform a first shift-read operation on the target memory cells with the first read voltage plus a first offset voltage;

instruct the peripheral circuit to perform a second shift-read operation on the target memory cells with the first read voltage minus the first offset voltage; and in response to that a difference between first bit flip information of the first shift-read operation and second bit flip information of the second shift-read operation is equal to or lower than a threshold, determine that the first read voltage is a first optimal read voltage, wherein the first single read level of a first page is under a multi-level architecture, wherein the first bit flip information and the second bit flip information each comprise a bit flip count indicating that a number of bits that have transitioned from a "0" to a "1" state or from a "1" to a "0" state between read operations.

19. The memory system of claim 18, wherein the memory controller is further configured to:

calculate the first bit flip information of the first shift-read operation and the second bit flip information of the second shift-read operation.

20. The memory system of claim 19, wherein the memory controller is further configured to:

store the first bit flip information of the first shift-read operation and the second bit flip information of the second shift-read operation in a cache memory of the memory controller.

* * * * *